United States Patent
Hijikata et al.

(10) Patent No.: US 9,284,718 B2
(45) Date of Patent: Mar. 15, 2016

(54) POWER REGENERATION DEVICE FOR OPERATING MACHINE

(75) Inventors: Seiji Hijikata, Kasumigaura (JP); Kazuo Fujishima, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 295 days.

(21) Appl. No.: 14/117,961

(22) PCT Filed: Jun. 13, 2012

(86) PCT No.: PCT/JP2012/065151
§ 371 (c)(1),
(2), (4) Date: Nov. 15, 2013

(87) PCT Pub. No.: WO2012/173149
PCT Pub. Date: Dec. 20, 2012

(65) Prior Publication Data
US 2014/0090367 A1 Apr. 3, 2014

(30) Foreign Application Priority Data

Jun. 15, 2011 (JP) .................... 2011-133610
Sep. 14, 2011 (JP) .................... 2011-201176

(51) Int. Cl.
| E02F 9/22 | (2006.01) |
| E02F 9/20 | (2006.01) |
| F15B 21/14 | (2006.01) |
| E02F 9/24 | (2006.01) |
| E02F 9/26 | (2006.01) |

(52) U.S. Cl.
CPC .............. *E02F 9/2217* (2013.01); *E02F 9/2091* (2013.01); *E02F 9/2095* (2013.01);
(Continued)

(58) Field of Classification Search
CPC ....... F15B 21/14; E02F 9/2075; E02F 9/2091
USPC ........................................................ 60/414
See application file for complete search history.

(56) References Cited

U.S. PATENT DOCUMENTS

| 4,476,679 A | 10/1984 | Sato |
| 7,086,226 B2 * | 8/2006 | Oguri .................... E02F 9/2075 60/414 |

(Continued)

FOREIGN PATENT DOCUMENTS

| JP | 56-15428 A | 9/1981 |
| JP | 2007-107616 A | 4/2007 |

(Continued)

OTHER PUBLICATIONS

International Preliminary Report on Patentability received in International Application No. PCT/JP2012/065151 dated Jan. 3, 2014.

*Primary Examiner* — Thomas E Lazo
(74) *Attorney, Agent, or Firm* — Mattingly & Malur, PC

(57) ABSTRACT

A power regeneration device for an operating machine has a hydraulic cylinder and a return line through which fluid returning to a tank flows when the hydraulic cylinder contracts. The return line branches into a plurality of hydraulic lines through a branching part and includes a regeneration line that which leads returning fluid to the tank via a hydraulic motor to which a generator is connected. A control valve line is connected to the branching part and leads the returning fluid to the tank via a control valve. An electricity storage device stores electric power generated by the generator, and an electric amount detector detects the electric amount of the electricity storage device. A flow rate calculator calculates the flow rate of the returning fluid flowing through the regeneration line and the flow rate of the returning fluid flowing through the control valve line depending on an electric amount signal.

7 Claims, 13 Drawing Sheets

(52) U.S. Cl.
CPC ............. *E02F9/2221* (2013.01); *E02F 9/2285* (2013.01); *E02F 9/2292* (2013.01); *E02F 9/2296* (2013.01); *E02F 9/24* (2013.01); *E02F 9/268* (2013.01); *F15B 21/14* (2013.01)

(56) References Cited

U.S. PATENT DOCUMENTS

| | | | | |
|---|---|---|---|---|
| 8,468,816 B2 * | 6/2013 | Sora | ...................... | E02F 9/2091 60/414 |
| 8,606,452 B2 * | 12/2013 | Kawasaki | ............. | E02F 9/2075 701/50 |
| 8,855,872 B2 * | 10/2014 | Yamazaki | ............. | E02F 9/2091 60/420 |
| 9,127,438 B2 * | 9/2015 | Kawasaki | ............. | E02F 9/2075 |

FOREIGN PATENT DOCUMENTS

| | | |
|---|---|---|
| JP | 2009-287344 A | 12/2009 |
| JP | 2010-261539 A | 11/2010 |
| JP | 2011-127569 A | 6/2011 |

* cited by examiner

POWER REGENERATION DEVICE FOR OPERATING MACHINE

TECHNICAL FIELD

The present invention relates to a power regeneration device for an operating machine, and in particular, to a power regeneration device for an operating machine that recovers energy by use of hydraulic fluid returning from hydraulic actuators.

BACKGROUND ART

There has been disclosed a construction machine in which energy is recovered by allowing fluid returning from hydraulic actuators to drive a hydraulic motor and, for the purpose of improving the operability of the construction machine, the returning flow from the boom is made to branch off to the regeneration side and the control valve side (see Patent Literature 1, for example).

PRIOR ART LITERATURE

Patent Literature

Patent Literature 1: JP-2007-107616-A

SUMMARY OF THE INVENTION

Problem to be Solved by the Invention

In cases where a hydraulic excavator is employed as the construction machine as in the above Patent Literature, the amount of the regenerated power increases when the construction machine is used for work including frequent boom raising/lowering operations (e.g., loading gravel onto a dump truck). As a result, there arises a possibility of the overcharge of the construction machine's electricity storage device and deterioration/failure/breakage of the device. As a method for preventing the overcharge of the electricity storage device, it is possible to equip the construction machine with a high-capacity electricity storage device and use the electricity storage device with a wide safety margin.

However, the electricity storage device is an extremely expensive component among those of a hybrid hydraulic excavator, for example, and the price of the electricity storage device increases roughly in proportion to the capacity. Therefore, it is being requested to reduce the capacity of the electricity storage device.

The object of the present invention, which has been made in consideration of the above situation, is to provide a power regeneration device for an operating machine capable of preventing the overcharge of the electricity storage device without the need of increasing the capacity of the electricity storage device.

Means for Solving the Problem

To achieve the above object, the invention is, in a first aspect, a power regeneration device for an operating machine equipped with an engine, a hydraulic pump driven by the engine, a control valve for switching the flow of hydraulic fluid from the hydraulic pump and supplying the hydraulic fluid to a hydraulic cylinder, and an operating device for controlling the control valve, comprising: a hydraulic line which is connected to a bottom-side hydraulic chamber of the hydraulic cylinder and through which returning fluid returning to a tank flows when the hydraulic cylinder contracts; a branching part which is provided in the hydraulic line to separate the hydraulic line into a plurality of hydraulic lines; a regeneration line which is connected to the branching part and leads the returning fluid to the tank via a hydraulic motor that is connected with a generator controlled by an inverter; a control valve line which is connected to the branching part and leads the returning fluid to the tank via the control valve; operation amount detection means which detects the operation amount of the operating device; an electricity storage device which stores electric power generated by the generator; electric amount detection means which detects the electric amount of the electricity storage device; flow rate calculation means which calculates the flow rate of the returning fluid flowing through the regeneration line and the flow rate of the returning fluid flowing through the control valve line depending on an electric amount signal from the electric amount detection means; first flow rate control means which controls the flow rate through the control valve line based on the result of the calculation by the flow rate calculation means; and second flow rate control means which controls the flow rate through the regeneration line based on the result of the calculation by the flow rate calculation means.

A second aspect of the invention is a power regeneration device for an operating machine equipped with an engine, a hydraulic pump driven by the engine, a control valve for switching the flow of hydraulic fluid from the hydraulic pump and supplying the hydraulic fluid to a hydraulic cylinder, and an operating device for controlling the control valve, comprising: a hydraulic line which is connected to a bottom-side hydraulic chamber of the hydraulic cylinder and through which returning fluid returning to a tank flows when the hydraulic cylinder contracts; a branching part which is provided in the hydraulic line to separate the hydraulic line into a plurality of hydraulic lines; a regeneration line which is connected to the branching part and leads the returning fluid to the tank via a hydraulic motor that is connected with a generator; a control valve line which is connected to the branching part and leads the returning fluid to the tank via the control valve; operation amount detection means which detects the operation amount of the operating device; an electricity storage device which stores electric power generated by the generator; electric amount detection means which detects the electric amount of the electricity storage device; characteristic selection means which stores a plurality of characteristics of a meter-out flow rate of the hydraulic cylinder with respect to the operation amount of the operating device when the hydraulic cylinder is contracted, receives the electric amount signal from the electric amount detection means, and outputs one of the stored characteristics of the meter-out flow rate depending on the electric amount signal; flow rate calculation means which calculates the flow rate of the returning fluid flowing through the regeneration line and the flow rate of the returning fluid flowing through the control valve line based on the operation amount detected by the operation amount detection means and the relationship between the operation amount and the meter-out flow rate outputted by the characteristic selection means; first flow rate control means which controls the flow rate through the control valve line based on the result of the calculation by the flow rate calculation means; and second flow rate control means which controls the flow rate through the regeneration line based on the result of the calculation by the flow rate calculation means.

A third aspect of the invention is a power regeneration device for an operating machine according to the first or second aspect, wherein the flow rate calculation means fixes a distribution characteristic between the flow rate of the returning fluid flowing through the regeneration line and the flow rate of the returning fluid flowing through the control valve line while a lowering operation signal of the operating device is detected.

A fourth aspect of the invention is a power regeneration device for an operating machine according to the first aspect, wherein the flow rate calculation means includes: first flow rate calculation means which stores a characteristic of a meter-out flow rate of the hydraulic cylinder with respect to the operation amount of the operating device when the hydraulic cylinder is contracted, receives an operation amount signal from the operation amount detection means, and calculates the flow rate of the returning fluid flowing through the control valve line based on the operation amount signal and the stored characteristic of the meter-out flow rate; second flow rate calculation means which stores a characteristic of the meter-out flow rate of the hydraulic cylinder with respect to the operation amount of the operating device when the hydraulic cylinder is contracted, receives the operation amount signal from the operation amount detection means, and calculates the flow rate of the returning fluid flowing through the regeneration line based on the operation amount signal and the stored characteristic of the meter-out flow rate; and correction signal calculation means which receives the electric amount signal from the electric amount detection means and calculates a correction characteristic depending on the electric amount signal. An output signal from the first flow rate calculation means and an output signal from the second flow rate calculation means are corrected according to a correction signal from the correction signal calculation means.

A fifth aspect of the invention is a power regeneration device for an operating machine according to the first aspect, wherein a solenoid proportional valve for controlling pilot pressure on the control valve is provided in order to control the flow rate of the returning fluid flowing through the control valve line.

A sixth aspect of the invention is a power regeneration device for an operating machine according to the second aspect, further comprising abnormality detection means for detecting abnormalities occurring to the generator and the inverter. When an abnormality of the generator or the inverter is detected by the abnormality detection means, the characteristic selection means outputs a characteristic of the meter-out flow rate for setting the flow rate of the returning fluid flowing through the regeneration line at 0 to the second flow rate calculation means while outputting a characteristic of the meter-out flow rate for increasing the flow rate of the returning fluid flowing through the control valve line by the decrease in the flow rate of the returning fluid through the regeneration line to the first flow rate calculation means.

A seventh aspect of the invention is a power regeneration device for an operating machine according to the fourth aspect, further comprising abnormality detection means for detecting abnormalities occurring to the generator and the inverter. When an abnormality of the generator or the inverter is detected by the abnormality detection means, the correction signal calculation means corrects the flow rate of the returning fluid flowing through the regeneration line, which is controlled by the second flow rate control means according to the operation amount, to 0, while correcting the flow rate of the returning fluid flowing through the control valve line, which is controlled by the first flow rate control means according to the operation amount, so as to increase the flow rate by the decrease in the flow rate at the second flow rate control means.

Effect of the Invention

According to the present invention, the overcharge of the electricity storage device can be prevented without the need of increasing the capacity of the electricity storage device. Consequently, the productivity can be increased.

MODE FOR CARRYING OUT THE INVENTION

First Embodiment

Figure 1:
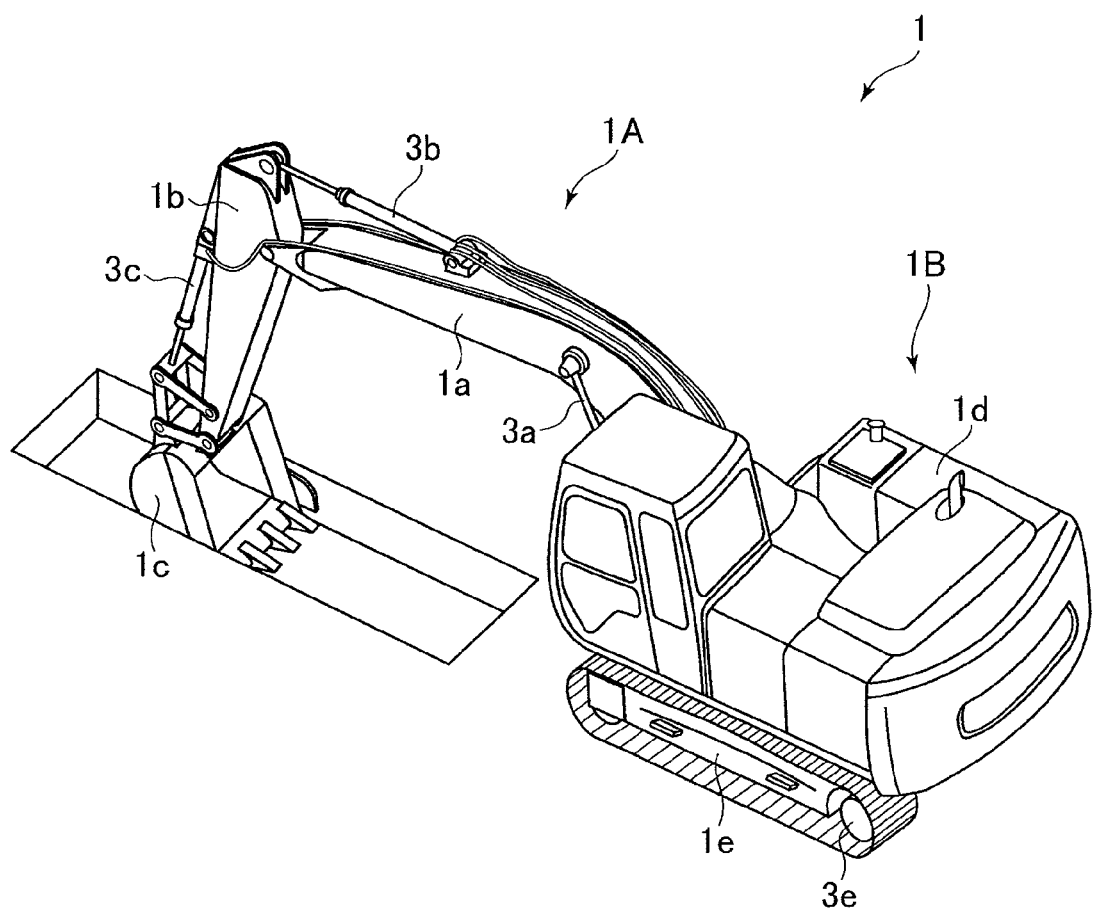
FIG. 1 is a perspective view showing a hydraulic excavator equipped with a first embodiment of the power regeneration device for an operating machine in accordance with the present invention.
Figure 2:
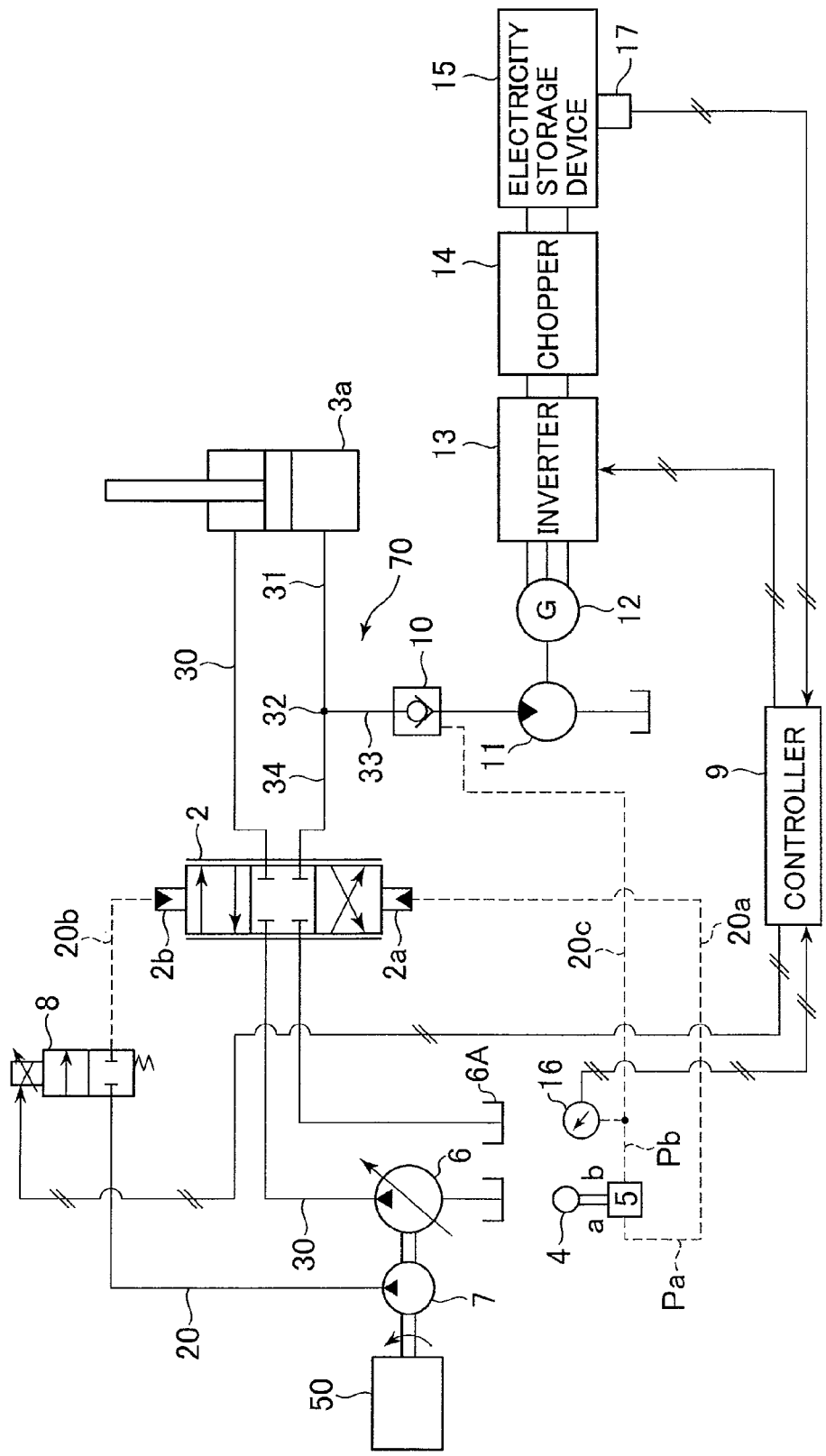
FIG. 2 is a schematic diagram of a control system illustrating the first embodiment of the power regeneration device for an operating machine in accordance with the present invention.

Referring now to the drawings, a description will be given in detail of preferred embodiments of a power regeneration device for an operating machine in accordance with the present invention. FIG. 1 is a perspective view showing a hydraulic excavator equipped with a first embodiment of the power regeneration device for an operating machine in accordance with the present invention. FIG. 2 is a schematic diagram of a control system illustrating the first embodiment of the power regeneration device for an operating machine in accordance with the present invention.

Referring to FIG. 1, the hydraulic excavator 1 comprises a multijoint work implement 1A and a vehicle body 1B. The work implement 1A includes a boom 1a, an arm 1b and a bucket 1c. The vehicle body 1B includes an upper swing structure 1d and a lower travel structure 1e. The boom 1a, which is supported on the upper swing structure 1d to be rotatable, is driven by a boom cylinder (hydraulic cylinder) 3a. The upper swing structure 1d is mounted on the lower travel structure 1e to be swingable.

The arm 1b, which is supported by the boom 1a to be rotatable, is driven by an arm cylinder (hydraulic cylinder) 3b. The bucket 1c, which is supported by the arm 1b to be rotatable, is driven by a bucket cylinder (hydraulic cylinder) 3c. The driving of the boom cylinder 3a, the arm cylinder 3b and the bucket cylinder 3c is controlled by an operating device 4 (see FIG. 2) which is installed in the cab of the upper swing structure 1d to output hydraulic signals.

The embodiment shown in FIG. 2 illustrates only a control system related to the boom cylinder 3a for operating the boom 1a. The control system includes a control valve 2, the operating device 4, a solenoid proportional valve 8, a pilot check valve 10, an inverter 13, a chopper 14, an electricity storage device 15, a pressure sensor 16, and a voltage sensor 17. The control system is equipped with a controller 9 as its control unit.

A hydraulic pump 6, a tank 6A and a pilot fluid pump 7 for supplying pilot hydraulic fluid are provided as hydraulic fluid source devices. The hydraulic pump 6 and the pilot fluid pump 7 are linked together by a common drive shaft and are driven by an engine 50 connected in series to the drive shaft.

A hydraulic line 30 for supplying hydraulic fluid from the hydraulic pump 6 to the boom cylinder 3a is equipped with the control valve 2 for controlling the direction and the flow rate of the hydraulic fluid in the hydraulic line 30. The control valve 2 switches its spool position according to the supply of the aforementioned pilot hydraulic fluid to its pilot pressure receiving parts 2a and 2b, supplies the hydraulic fluid from the hydraulic pump 6 to the hydraulic actuator 3a, and thereby drives the boom 1a.

The spool position of the control valve 2 is switched by operating a control lever, etc. of the operating device 4. The operating device 4 is equipped with a pilot valve 5. According to the operator's tilting the control lever, etc. in the direction "a" shown in FIG. 2 (boom raising direction operation), the pilot valve 5 supplies pilot primary hydraulic fluid, supplied from the pilot fluid pump 7 via an unshown pilot primary-side hydraulic line, to the pilot pressure receiving part 2a of the control valve 2 via a pilot secondary-side hydraulic line 20a. According to the operator's tilting the control lever, etc. in the direction "b" shown in FIG. 2 (boom lowering direction operation), the pilot valve 5 supplies the pilot primary hydraulic fluid, supplied from the pilot fluid pump 7 via the unshown pilot primary-side hydraulic line, to a pressure receiving part of the pilot check valve 10 via a pilot secondary-side hydraulic line 20c.

The pilot secondary-side hydraulic line 20c is equipped with the pressure sensor 16. The pressure sensor 16 functions as signal conversion means which detects lowering-side pilot pressure Pb of the pilot valve 5 of the operating device 4 and converts the lowering-side pilot pressure Pb into an electric signal corresponding to the pressure. The pressure sensor 16 is configured to be able to output the converted electric signal to the controller 9.

Meanwhile, one end of a pilot secondary-side hydraulic line 20b is connected to the pilot pressure receiving part 2b of the control valve 2. The other end of the pilot secondary-side hydraulic line 20b is connected to an output-side port of the solenoid proportional valve 8 which is of the two-position two-port type. Connected to an input-side port of the solenoid proportional valve 8 is a pilot hydraulic line 20 for supplying the hydraulic fluid from the pilot fluid pump 7.

Next, the power regeneration device 70 will be explained below. As shown in FIG. 2, the power regeneration device 70 comprises a hydraulic line 31, a branching part 32, a regeneration line 33, a control valve line 34, the pressure sensor 16, the controller 9, the inverter 13, the chopper 14, the electricity storage device 15, and the voltage sensor 17.

The hydraulic line 31 is a line through which the hydraulic fluid returning to the tank 6A (returning fluid) flows when the boom cylinder 3a contracts. The hydraulic line 31 is connected to a bottom-side hydraulic chamber of the boom cylinder 3a. The hydraulic line 31 is formed to have the branching part 32 where the hydraulic line 31 branches out into a plurality of hydraulic lines. The regeneration line 33 and the control valve line 34 are connected to the branching part 32.

The regeneration line 33 is provided with the pilot check valve 10 and a hydraulic motor 11. The hydraulic motor 11 is arranged downstream of the pilot check valve 10 and connected to a generator 12. The regeneration line 33 leads the returning fluid from the bottom-side hydraulic chamber of the boom cylinder 3a to the tank 6A via the hydraulic motor 11. When the returning fluid at the time of lowering the boom is introduced into the regeneration line 33 to rotate the hydraulic motor 11, the generator 12 is rotated by the hydraulic motor 11 and generates electric power. The generated electric power is stored in the electricity storage device 15 via the inverter 13 and the chopper 14 for boosting the voltage. In this embodiment, the explanation will be given by taking a capacitor as an example of the electricity storage device 15.

The value of SOC (State Of Charge) as the electric amount of the electricity storage device 15 is inputted to the controller 9. In the case where the electricity storage device 15 is implemented by a capacitor, the SOC value can be checked by detecting the voltage of the capacitor. In this embodiment, the electricity storage device 15 is provided with the voltage sensor 17 and a signal outputted by the voltage sensor 17 is inputted to the controller 9.

The pilot check valve 10 is provided for preventing accidental inflow of the hydraulic fluid to the regeneration line 33 from the hydraulic line 31 (dropping of the boom) such as leakage from the regeneration line 33. The pilot check valve 10 usually blocks up the regeneration line 33.

The lowering-side pilot pressure Pb of the pilot valve 5 of the operating device 4 is supplied to the pilot check valve 10 when the boom lowering operation is performed by the operator. The pilot check valve 10 has been set to be opened by an operating signal (pilot pressure Pb) that is outputted when the operation amount of the operating device 4 in the boom lowering operation has reached a prescribed value. With this setting, the returning fluid is supplied to the hydraulic motor 11 when the operation amount of the operating device 4 is the prescribed value or greater.

The revolution speed of the hydraulic motor 11 and the generator 12 during the boom lowering operation is controlled by the inverter 13. Since the flow rate of the hydraulic fluid flowing through the hydraulic motor 11 can be adjusted by the control of the revolution speed of the hydraulic motor 11 by the inverter 13 as above, it is possible to adjust the flow rate of the returning fluid flowing from the bottom-side hydraulic chamber of the boom cylinder 3a to the regeneration line 33. In short, the inverter 13 in this embodiment functions as flow rate control means for controlling the flow rate through the regeneration line 33.

The control valve line 34 leads the returning fluid from the bottom-side hydraulic chamber to the tank 6A via the control valve 2 (spool-type directional control valve) functioning as flow rate control means. An operating signal (hydraulic signal) outputted from the pilot fluid pump 7 via the solenoid proportional valve 8 in the boom lowering operation is inputted to one pilot pressure receiving part (2b) of the control valve 2. Inputted to the other pilot pressure receiving part (2a) is raising-side pilot pressure Pa of the pilot valve 5 which is supplied from the operating device 4 in the boom raising operation. The spool of the control valve 2 moves according to the operating signals inputted to the two pilot pressure receiving parts 2a and 2b and thereby switches and controls the direction and the flow rate of the hydraulic fluid supplied from the hydraulic pump 6 to the boom cylinder 3a.

The solenoid proportional valve 8 outputs an operating signal corresponding to the operation amount of the operating device 4 in the boom lowering operation to the pilot pressure receiving part 2b of the control valve 2, by which the flow rate of the returning fluid flowing from the bottom-side hydraulic chamber through the control valve 2 (i.e., the flow rate of the returning fluid flowing through the control valve line 34) is adjusted. In short, the solenoid proportional valve 8 in this embodiment functions as flow rate control means for controlling the flow rate through the control valve line 34.

Inputted to the input port of the solenoid proportional valve 8 in this embodiment is the hydraulic fluid outputted from the pilot fluid pump 7. Meanwhile, a command value outputted from a solenoid proportional valve output value calculation unit 104 (explained later, see FIG. 5) of the controller 9 is inputted to an operating part of the solenoid proportional valve 8. According to this command value, the port position of the solenoid proportional valve 8 is adjusted and the pressure of the hydraulic fluid supplied from the pilot fluid pump 7 to the pressure receiving part 2b of the control valve 2 is adjusted properly.

The controller 9 receives the pilot pressure Pb, which is supplied from the pilot valve 5 of the operating device 4, inputted from the pressure sensor 16, and the SOC value, which is supplied from the electricity storage device 15, inputted from the voltage sensor 17. The controller 9 executes calculations based on these input values, outputs control commands to the solenoid proportional valve 8 and the inverter 13, and thereby controls the flow rates of the returning fluid flowing through the regeneration line 33 and the control valve line 34.

Next, the outline of the operation of the components of the power regeneration device according to the operator's operation on the operating device 4 will be explained below referring to FIG. 2.

First, when the operator tilts the control lever of the operating device 4 in the direction "a", the pilot pressure Pa generated by the pilot valve 5 is supplied to the pilot pressure receiving part 2a of the control valve 2, by which the control valve 2 is operatively switched. By the switching, the hydraulic fluid from the hydraulic pump 6 is led to the hydraulic line 31 out of the boom cylinder 3a, causing the expanding operation of the boom cylinder 3a. Accordingly, the returning flow discharged from a rod-side hydraulic chamber of the boom cylinder 3a is led to the tank 6A through the hydraulic line 30 and the control valve 2. In this case, no operating pressure is led to the pilot check valve 10, and thus the regeneration line 33 remains blocked up and the regeneration operation is not performed.

Subsequently, when the operator tilts the control lever of the operating device 4 in the direction "b", the pilot pressure Pb generated by the pilot valve 5 is detected by the pressure sensor 16 and inputted to the controller 9. The controller 9 outputs a control command to the solenoid proportional valve 8 according to the inputted pilot pressure by use of a preset table. Consequently, the pilot pressure is applied to the pilot pressure receiving part 2b of the control valve 2 and the control valve 2 is operatively switched. By the switching, the hydraulic fluid from the hydraulic pump 6 is led to the hydraulic line 30 of the boom cylinder 3a and contracts the boom cylinder 3a. Accordingly, the returning flow discharged from the bottom-side hydraulic chamber of the boom cylinder 3a is led to the tank 6A through the hydraulic line 31 and the control valve 2.

At the same time, the pilot check valve 10 opens due to the pilot pressure Pb supplied thereto from the pilot valve 5 via the pilot secondary-side hydraulic line 20c as operating pressure. Consequently, part of the returning flow discharged from the bottom-side hydraulic chamber of the boom cylinder 3a is led to the hydraulic motor 11 and the power generation is performed by the generator 12 connected to the hydraulic motor 11. The generated electric energy is stored in the electricity storage device 15.

Meanwhile, the controller 9 judges the status based on the inputted signals of the pilot pressure Pb and the SOC and calculates and outputs the command value for the solenoid proportional valve 8 and control command values for the inverter 13 which is the control unit for the generator 12. Consequently, the returning flow discharged from the bottom-side hydraulic chamber of the boom cylinder 3a in the boom lowering operation is led to both the control valve 2 (control valve-side flow rate) and the hydraulic motor 11 for the regeneration (regeneration-side flow rate), by which appropriate regeneration operation is carried out while securing fine operability.

Figure 3:
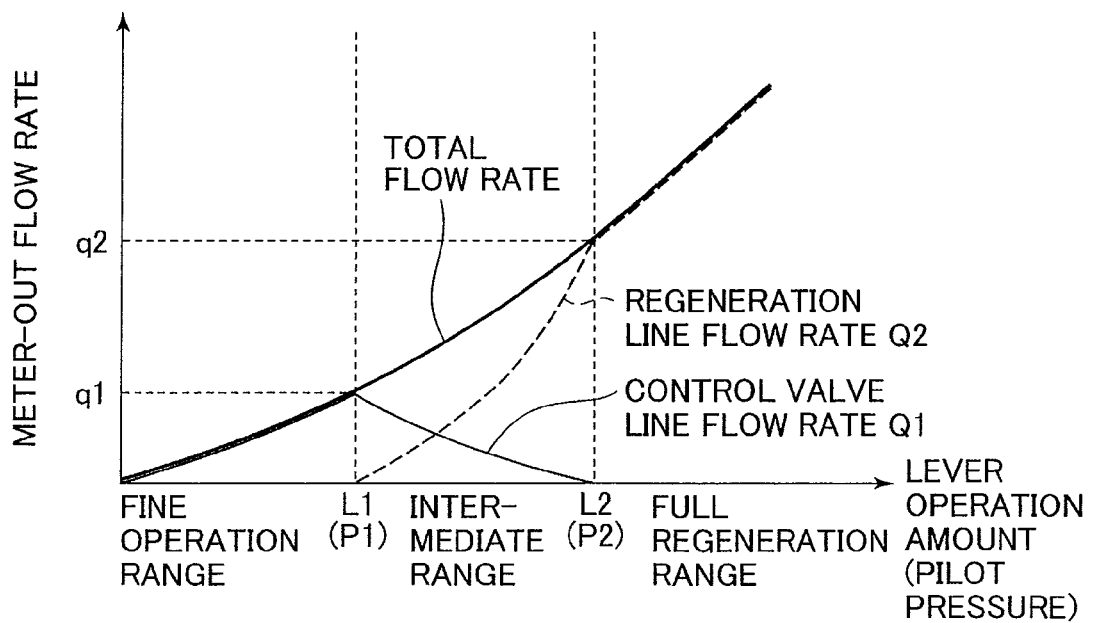
FIG. 3 is a metering characteristic diagram employed by a characteristic selection circuit of the controller in the first embodiment of the power regeneration device for an operating machine in accordance with the present invention.

Here, the relationship between the pilot pressure Pb and the returning flow discharged from the bottom-side hydraulic chamber of the boom cylinder 3a, which is controlled by the controller 9, will be explained referring to FIG. 3. FIG. 3 is a metering characteristic diagram employed by a characteristic selection circuit of the controller in the first embodiment of the power regeneration device for an operating machine in accordance with the present invention.

In FIG. 3, the metering graph represented by the thin solid line indicates the relationship between the lever operation amount of the operating device 4 and the flow rate of the returning fluid flowing through the control valve line 34 (control valve line flow rate Q1). The metering graph represented by the broken line indicates the relationship between the lever operation amount of the operating device 4 and the flow rate of the returning fluid flowing through the regeneration line 33 (regeneration line flow rate Q2). The metering graph represented by the thick solid line indicates the combination of the above two metering graphs, that is, the sum total of the control valve line flow rate Q1 and the regeneration line flow rate Q2.

As indicated by the metering graphs, the total flow rate coincides with the control valve line flow rate Q1 when the lever operation amount of the operating device 4 is less than a first set value L1 (hereinafter referred to as a "fine operation range" as needed). In this case, all the returning fluid from the bottom-side hydraulic chamber flows in the control valve line 34, while the regeneration line 33 is closed by the pilot check valve 10.

When the lever operation amount of the operating device 4 is a second set value L2 (greater than the first set value L1) or more (hereinafter referred to as a "full regeneration range" as needed), the total flow rate coincides with the regeneration line flow rate Q2. In this case, all the returning fluid from the bottom-side hydraulic chamber flows in the regeneration line 33, while the control valve line 34 is closed by the control valve 2.

When the lever operation amount is the first set value L1 or more and less than the second set value L2 (hereinafter referred to as an "intermediate range" as needed), the returning fluid flows in both the regeneration line 33 and the control valve line 34. Specifically, with the increase in the lever operation amount of the operating device 4 from the first set value L1 to the second set value L2, the control valve line flow rate Q1 gradually decreases from the total flow rate q1 at the first set value L1 to 0, while the regeneration line flow rate Q2 gradually increases from 0 to the total flow rate q2 at the second set value L2.

Figure 4:
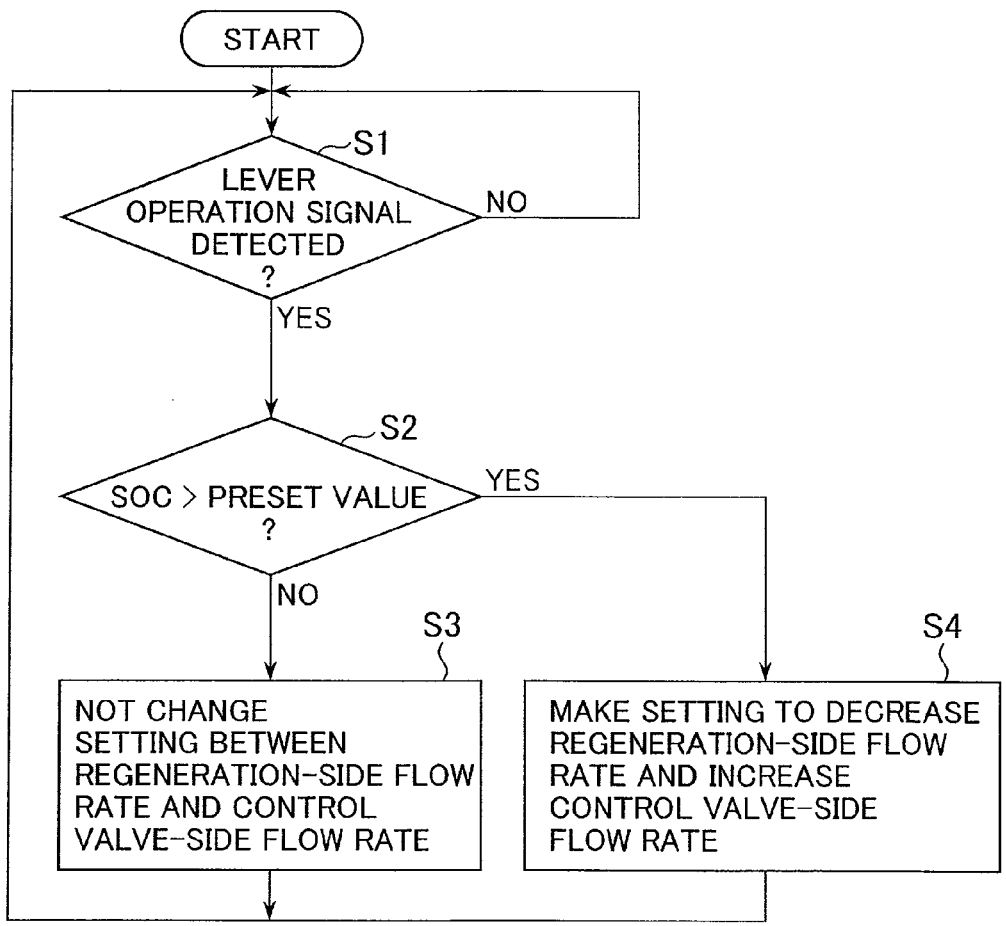
FIG. 4 is a flow chart showing a process executed by the controller in the first embodiment of the power regeneration device for an operating machine in accordance with the present invention.

Next, a method employed by the controller 9 in this embodiment for changing the regeneration line flow rate and the control valve line flow rate depending on the SOC of the electricity storage device 15 will be explained briefly referring to FIG. 4. FIG. 4 is a flow chart showing a process executed by the controller in the first embodiment of the power regeneration device for an operating machine in accordance with the present invention.

First, as the starting state, the operator turns the key (unshown) of the hydraulic excavator to the ON position, for example.

In step S1, the controller judges the presence/absence of the boom lowering lever operation. Specifically, the judgment is made based on the presence/absence of the signal of the pilot pressure Pb inputted from the pressure sensor 16. When the controller judges that the boom lowering lever operation is under way (YES), the process advances to step S2, otherwise the step S1 is repeated until the judgment becomes YES.

In the step S2, the controller judges whether the SOC value has exceeded a preset value or not. Specifically, the judgment is made by comparing the voltage value of the electricity storage device 15 inputted from the voltage sensor 17 with a predetermined value. When the SOC value has not exceeded the preset value (NO), the process advances to step S3. When the SOC value has exceeded the preset value (YES), the process advances to step S4.

In the step S3, a preset distribution between the regeneration line flow rate and the control valve line flow rate is maintained.

In the step S4, the preset distribution between the regeneration line flow rate and the control valve line flow rate is changed. Specifically, the regeneration line flow rate is decreased and the control valve line flow rate is increased. Since the regeneration line flow rate is decreased when the SOC is greater than a reference value, the overcharge of the electricity storage device 15 by the regenerative electric power can be prevented.

After the step S3 or S4, the process returns to the step S1 to repeat the above procedure.

Figure 5:
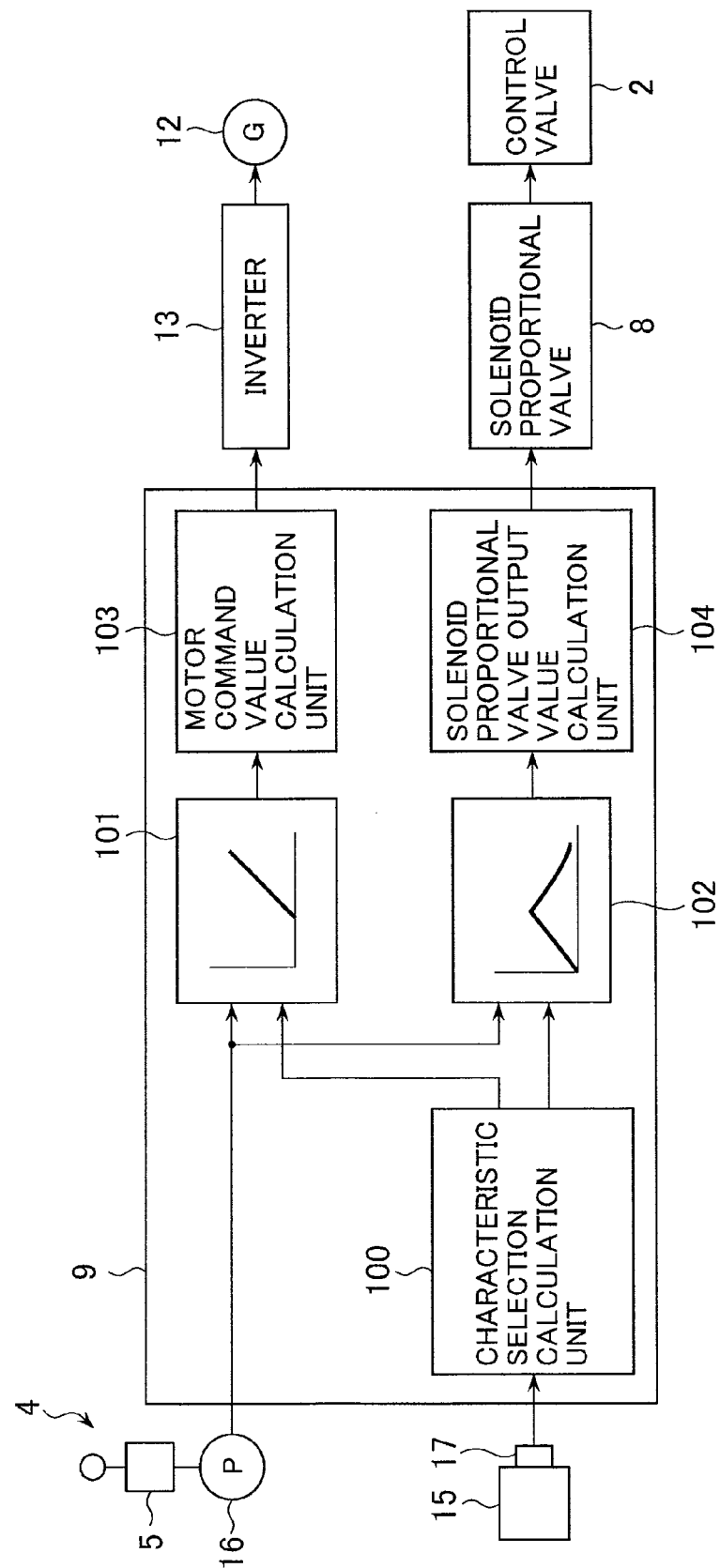
FIG. 5 is a block diagram of the controller constituting the first embodiment of the power regeneration device for an operating machine in accordance with the present invention.
Figure 6A:
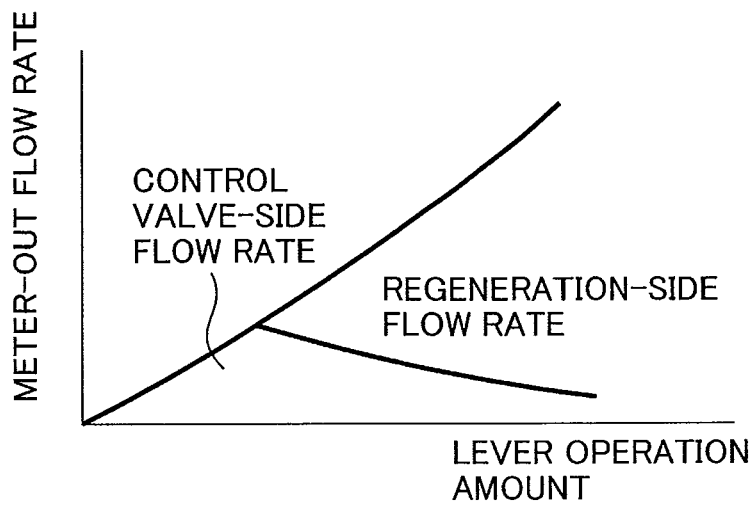
FIG. 6A is another metering characteristic diagram for explaining the characteristic selection circuit of the controller in the first embodiment of the power regeneration device for an operating machine in accordance with the present invention.
Figure 6B:
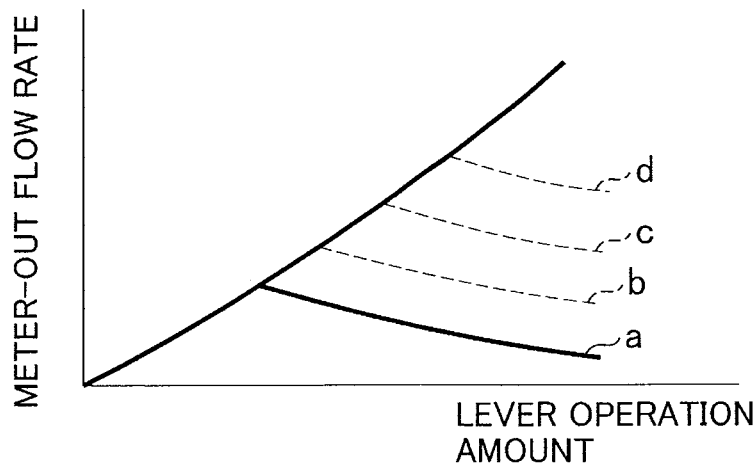
FIG. 6B is still another metering characteristic diagram for explaining the characteristic selection circuit of the controller in the first embodiment of the power regeneration device for an operating machine in accordance with the present invention.

Next, the control by the controller 9 in this embodiment will be explained below referring to figures. FIG. 5 is a block diagram of the controller constituting the first embodiment of the power regeneration device for an operating machine in accordance with the present invention. FIG. 6A is another metering characteristic diagram for explaining the characteristic selection circuit of the controller in the first embodiment of the power regeneration device for an operating machine in accordance with the present invention. FIG. 6B is still another metering characteristic diagram for explaining the characteristic selection circuit of the controller in the first embodiment of the power regeneration device for an operating machine in accordance with the present invention. Reference characters in FIGS. 5 to 6B identical with those in FIGS. 1 to 4 represent components identical with those in FIGS. 1 to 4, and thus repeated explanation thereof is omitted for brevity.

The controller 9 shown in FIG. 5 includes a characteristic selection calculation unit 100, a first flow rate calculation unit 102 (flow rate calculation means), a second flow rate calculation unit 101 (flow rate calculation means), a motor command value calculation unit 103, and the solenoid proportional valve output value calculation unit 104.

As shown in FIG. 5, the characteristic selection calculation unit 100 detects the SOC based on the voltage value of the capacitor, which is the electricity storage device 15, detected by the voltage sensor 17 and selects and outputs a metering characteristic according to the result of comparison between the detected SOC and a preset value.

FIG. 6A shows a metering characteristic that is selected when the SOC is lower than the preset value, that is, when the electric amount of the electricity storage device 15 is low. This metering characteristic indicates that fine operability is secured in the fine operation range, in which fine operability is necessary, by feeding the flow to the control valve as much as possible, while the regeneration control is executed in the full regeneration range, in which fine operability is not that necessary, by feeding a lot of flow to the regeneration side.

FIG. 6B indicates selection of different metering characteristics differing from the metering characteristic of FIG. 6A in the distribution between the regeneration line flow rate and the control valve line flow rate depending on the SOC value. Specifically, with the increase in the SOC value, metering characteristics, each having a preset distribution pattern, are selected successively so as to increase the control valve line flow rate and decrease the regeneration line flow rate. For example, the distribution pattern "a" is selected when the SOC value is low and switched to the distribution patterns b, c and d with the increase in the SOC value. Since the control valve line flow rate is increased and the regeneration line flow rate is decreased with the increase in the SOC value as above, the amount of the regeneration can be suppressed without changing the returning flow rate of the boom cylinder 3a.

Returning to FIG. 5, the first flow rate calculation unit 102 is a unit for calculating the flow rate Q1 of the returning fluid flowing through the control valve line 34 based on the metering graph outputted by the characteristic selection calculation unit 100 and the operation amount of the operating device 4 in the boom lowering operation. The second flow rate calculation unit 101 is a unit for calculating the flow rate Q2 of the returning fluid flowing through the regeneration line 33 based on the metering graph outputted by the characteristic selection calculation unit 100 and the operation amount of the operating device 4 in the boom lowering operation.

Each of the first flow rate calculation unit 102 and the second flow rate calculation unit 101, to which the pressure value detected by the pressure sensor 16 is inputted, calculates the operation amount of the operating device 4 based on the pressure value. Thereafter, the flow rates Q1 and Q2 corresponding to the calculated operation amount are calculated based on the metering graph outputted by the characteristic selection calculation unit 100 and are set as target flow rates of the lines 33 and 34. The first flow rate calculation unit 102 outputs the calculated control valve line flow rate Q1 to the solenoid proportional valve output value calculation unit 104, while the second flow rate calculation unit 101 outputs the calculated regeneration line flow rate Q2 to the motor command value calculation unit 103.

The motor command value calculation unit 103 is a unit which calculates a revolution speed of the hydraulic motor 11 in the regeneration line 33 necessary for drawing in the hydraulic fluid at the regeneration line flow rate Q2 calculated by the second flow rate calculation unit 101 and then outputs a revolution speed command value for having the hydraulic motor 11 rotate at the calculated revolution speed to the inverter 13. The inverter 13 receiving the revolution speed command value calculated by the motor command value calculation unit 103 rotates the hydraulic motor 11 and the generator 12 according to the revolution speed command value. Consequently, the returning fluid flows in the regeneration line 33 at the flow rate calculated by the second flow rate calculation unit 101.

The solenoid proportional valve output value calculation unit 104 is a unit which calculates an output value of the solenoid proportional valve 8 (i.e., the pressure of the hydraulic signal (pilot pressure) outputted from the solenoid proportional valve 8 to the pilot pressure receiving part 2*b* of the control valve 2) necessary for having the hydraulic fluid flow through the control valve 2 in the control valve line 34 at the control valve line flow rate Q1 calculated by the first flow rate calculation unit 102 and then outputs a command value to the solenoid proportional valve 8 so that the calculated output value may be implemented. The solenoid proportional valve 8, receiving the output value calculated by the solenoid proportional valve output value calculation unit 104, outputs an operating signal to the control valve 2 according to the output value. Consequently, the returning fluid flows in the control valve line 34 at the flow rate calculated by the first flow rate calculation unit 102.

Next, the operation of the components of the power regeneration device of this embodiment when the boom lowering operation is performed will be explained below.

When the operation for lowering the boom 1*a* is performed, the pilot pressure Pb of the pilot valve 5 of the operating device 4 is detected by the pressure sensor 16 and inputted to the controller 9. The pilot pressure Pb is inputted to the first flow rate calculation unit 102 and the second flow rate calculation unit 101 as the lever operation amount of the operating device 4.

Meanwhile, the voltage value of the capacitor, which is the electricity storage device 15, is constantly detected by the voltage sensor 17 and inputted to the controller 9 as the SOC signal. The SOC signal is inputted to the characteristic selection calculation unit 100 of the controller 9. When the SOC value is low, that is, when the electric amount of the electricity storage device 15 is low, the characteristic selection calculation unit 100 selects a metering characteristic for increasing the flow rate on the regeneration side as much as possible and reducing the flow rate on the control valve side and outputs a signal representing the selected metering characteristic to the first flow rate calculation unit 102 and the second flow rate calculation unit 101.

When the value of the detected SOC signal increases, the characteristic selection calculation unit 100 selects such a metering characteristic that the regeneration line flow rate is suppressed and the control valve line flow rate is increased. Consequently, the metering characteristic outputted to the first flow rate calculation unit 102 and the second flow rate calculation unit 101 is changed.

The first flow rate calculation unit 102 and the second flow rate calculation unit 101 output the control valve line flow rate Q1 and the regeneration line flow rate Q2 according to the lever operation amount of the operating device 4. The solenoid proportional valve output value calculation unit 104 and the motor command value calculation unit 103 calculate and output the control commands for the solenoid proportional valve 8 and the inverter 13, respectively.

According to the above-described first embodiment of the power regeneration device for an operating machine in accordance with the present invention, the overcharge of the electricity storage device 15 can be prevented without the need of increasing the capacity of the electricity storage device 15. Consequently, the productivity can be increased.

Further, according to the above-described first embodiment of the power regeneration device for an operating machine in accordance with the present invention, the regeneration line flow rate is suppressed depending on the operation amount of the operating device 4 and the SOC. Thus, the capacity of the electricity storage device 15 can be reduced while achieving the prevention of the overcharge of the electricity storage device 15. Furthermore, a suitable boom lowering speed desired by the operator can be secured since the control valve line flow rate can also be changed.

Second Embodiment

Figure 7:
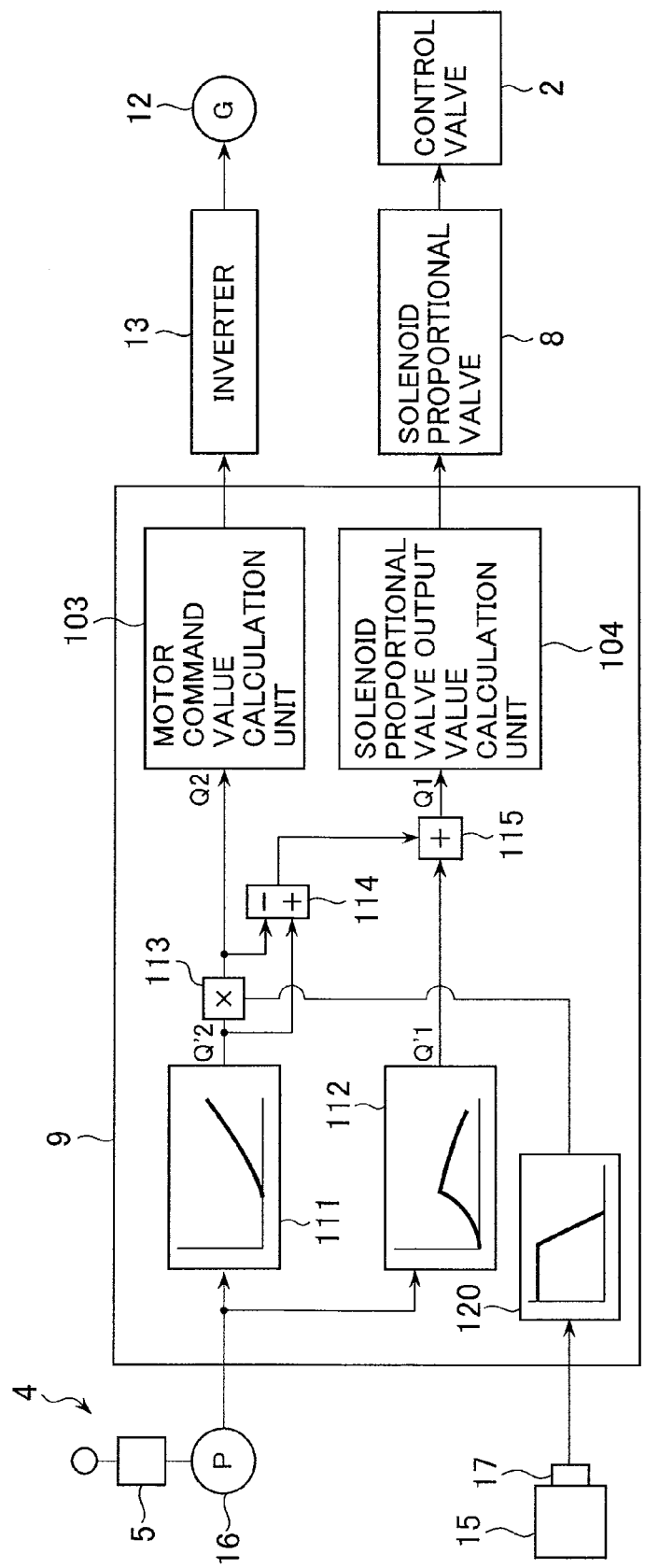
FIG. 7 is a block diagram of a controller constituting a second embodiment of the power regeneration device for an operating machine in accordance with the present invention.

Next, a second embodiment of the power regeneration device for an operating machine in accordance with the present invention will be described below referring to FIG. 7. FIG. 7 is a block diagram of a controller constituting the second embodiment of the power regeneration device for an operating machine in accordance with the present invention. Reference characters in FIG. 7 identical with those in FIGS. 1 to 6B represent components identical or corresponding to those in FIGS. 1 to 6B, and thus repeated explanation thereof is omitted for brevity.

In the first embodiment described above, the characteristic selection calculation unit 100 of the controller 9 outputs a metering characteristic selected depending on the SOC signal. Based on the metering characteristic, the control valve line flow rate Q1 and the regeneration line flow rate Q2 are calculated by the first flow rate calculation unit 102 and the second flow rate calculation unit 101, respectively. The controller 9 outputs the control commands to the solenoid proportional valve 8 and the inverter 13 so that the flow rates may be implemented. Therefore, if the SOC value changes during the boom lowering operation, there is a possibility that the selected metering characteristic changes and thereby causes a sudden change in the operability. This embodiment provides a power regeneration device for an operating machine capable of preventing the sudden change in the operability irrespective of the change in the SOC value.

The controller 9 shown in FIG. 7 includes a correction signal calculation unit 120, a first flow rate calculation unit 112 (flow rate calculation means), a second flow rate calculation unit 111 (flow rate calculation means), a multiplier 113, a subtractor 114, an adder 115, a motor command value calculation unit 103, and a solenoid proportional valve output value calculation unit 104.

The first flow rate calculation unit 112, to which the control valve line flow rate characteristic of the metering graph shown in FIG. 3 has been preset, receives the operation amount of the operating device 4 in the boom lowering operation, calculates the flow rate Q1' of the returning fluid flowing to the control valve line 34, and outputs the calculated flow rate Q1' to the adder 115. The second flow rate calculation unit 111, to which the regeneration line flow rate characteristic of the metering graph shown in FIG. 3 has been preset, calculates the flow rate Q2' of the returning fluid flowing to the regeneration line 33 based on the operation amount of the operating device 4 in the boom lowering operation and outputs the calculated flow rate Q2' to the multiplier 113 and the subtractor 114.

As shown in FIG. 7, the correction signal calculation unit 120 detects the SOC from the voltage value of the capacitor, which is the electricity storage device 15, detected by the voltage sensor 17, calculates a preset correction signal according to the detected SOC, and outputs the correction signal to the multiplier 113. The flow rate output Q2' of the second flow rate calculation unit 111 is corrected according to the correction signal. The maximum value of the output of the correction signal calculation unit 120 is 1. When the SOC value is low, the correction signal calculation unit 120 continues outputting a signal representing "1" and thus the flow rate value Q2' of the second flow rate calculation unit 111 is multiplied by 1 by the multiplier 113. In short, when the SOC value is low, the output signal Q2' of the second flow rate calculation unit 111 is directly used as the input value Q2 to the motor command value calculation unit 103.

In contrast, when the value of the SOC signal increases above a prescribed value, the correction signal calculation unit 120 outputs a value lower than 1 and not lower than 0 (lower limit). Consequently, the regeneration flow rate can be suppressed thanks to the stepless correction/reduction of the output signal Q2' of the second flow rate calculation unit 111 by the multiplier 113.

The subtractor 114 and the adder 115 are used for performing the calculation for increasing the control valve-side flow rate by the decrease in the regeneration flow rate. The subtractor 114 receives the outputs of the multiplier 113 and the second flow rate calculation unit 111 and supplies its output signal to the adder 115. The subtractor 114 is used for calculating the difference between the flow rates from the second flow rate calculation unit 111 before and after the correction. The adder 115 performs the calculation of adding the flow rate difference calculated by the subtractor 114 to the output of the first flow rate calculation unit 112 and thereby increasing the control valve-side flow rate. Consequently, a desired bottom flow rate of the boom cylinder 3a can be secured since the sum total of the outputs of the second flow rate calculation unit 111 and the first flow rate calculation unit 112 does not change.

The adder 115 outputs the calculated control valve line flow rate Q1 to the solenoid proportional valve output value calculation unit 104, while the multiplier 113 outputs the calculated regeneration line flow rate Q2 to the motor command value calculation unit 103.

Next, the operation of the components of the power regeneration device of this embodiment when the boom lowering operation is performed will be explained below.

When the operation for lowering the boom 1a is performed, the pilot pressure Pb of the pilot valve 5 of the operating device 4 is detected by the pressure sensor 16 and inputted to the controller 9. The pilot pressure Pb is inputted to the first flow rate calculation unit 112 and the second flow rate calculation unit 111 as the lever operation amount of the operating device 4 and flow rate signals corresponding to the lever operation amount are outputted by the first flow rate calculation unit 112 and the second flow rate calculation unit 111.

Meanwhile, the SOC signal is inputted to the correction signal calculation unit 120 and the signal for correcting the regeneration-side flow rate, the flow rate value Q2' from the second flow rate calculation unit 111, is outputted by the correction signal calculation unit 120 according to the SOC.

Since the output signal of the correction signal calculation unit 120 changes continuously according to the SOC, the corrected output value Q2 of the second flow rate calculation unit 111 also changes continuously.

The subtractor 114 and the adder 115 operate to increase the control valve-side flow rate by the decrease in the regeneration-side flow rate. Consequently, a desired bottom flow rate of the boom cylinder 3a can be secured since the sum total of the outputs of the second flow rate calculation unit 111 and the first flow rate calculation unit 112 does not change.

The control valve line flow rate Q1 and the regeneration line flow rate Q2 are generated by correcting the output values of the second flow rate calculation unit 111 and the first flow rate calculation unit 112 as explained above. The solenoid proportional valve output value calculation unit 104 and the motor command value calculation unit 103 receiving the target flow rates calculate and output the control commands for the solenoid proportional valve 8 and the inverter 13, respectively.

According to the above-described second embodiment of the power regeneration device for an operating machine in accordance with the present invention, the overcharge of the electricity storage device 15 can be prevented without the need of increasing the capacity of the electricity storage device 15. Consequently, the productivity can be increased.

Further, according to the above-described second embodiment of the power regeneration device for an operating machine in accordance with the present invention, the regeneration-side flow rate can be changed continuously depending on the SOC. Thus, it is possible to prevent a sudden change in the operability and secure satisfactory operation of the operating machine desired by the operator.

Third Embodiment

Figure 8:
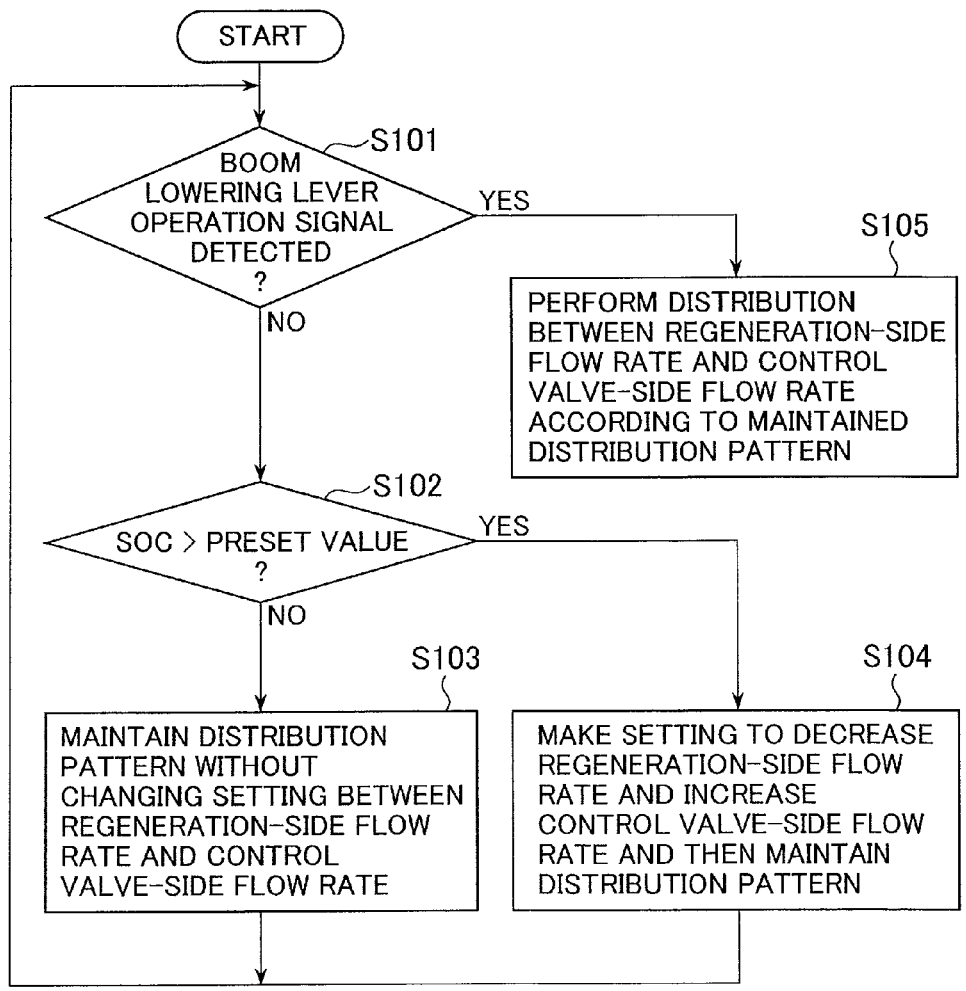
FIG. 8 is a flow chart showing a process executed by a controller in a third embodiment of the power regeneration device for an operating machine in accordance with the present invention.

Next, a third embodiment of the power regeneration device for an operating machine in accordance with the present invention will be described below referring to FIG. 8. FIG. 8 is a flow chart showing a process executed by a controller in the third embodiment of the power regeneration device for an operating machine in accordance with the present invention. Reference characters in FIG. 8 identical with those in FIGS. 1 to 7 represent components identical or corresponding to those in FIGS. 1 to 7, and thus repeated explanation thereof is omitted for brevity.

First, as the starting state, the operator turns the key (unshown) of the hydraulic excavator to the ON position, for example.

In step S101, the controller judges the presence/absence of the boom lowering lever operation. Specifically, the judgment is made based on the presence/absence of the signal of the pilot pressure Pb inputted from the pressure sensor 16. When the controller judges that no boom lowering lever operation is under way (NO), the process advances to step S102, otherwise (YES) the process advances to step S105.

In the step S102, the controller judges whether the SOC value has exceeded a preset value or not. Specifically, the judgment is made by comparing the voltage value of the electricity storage device 15 inputted from the voltage sensor 17 with a predetermined value. When the SOC value has not exceeded the preset value (NO), the process advances to step S103. When the SOC value has exceeded the preset value (YES), the process advances to step S104.

In the step S103, the distribution pattern is maintained without changing the preset setting of the regeneration line flow rate and the control valve line flow rate. This distribution pattern is the distribution pattern "a" shown in FIG. 6B (increasing the regeneration-side flow rate as much as possible), for example.

In the step S104, the preset distribution between the regeneration line flow rate and the control valve line flow rate is changed. Specifically, the setting is made to decrease the regeneration line flow rate and increase the control valve line flow rate and then the distribution pattern is maintained. This distribution pattern is the distribution pattern b, c or d shown in FIG. 6B, for example. Since the regeneration line flow rate is decreased when the SOC is greater than a reference value, the overcharge of the electricity storage device 15 by the regenerative electric power can be prevented.

The step S105 is executed when the controller judged that the boom lowering lever operation is under way in the step S101. In this case, the distribution pattern that was set in the step S103 of S104 is maintained.

After the step S103 or S104, the process returns to the step S101 to repeat the above procedure.

According to the above-described third embodiment of the power regeneration device for an operating machine in accordance with the present invention, the overcharge of the electricity storage device 15 can be prevented without the need of increasing the capacity of the electricity storage device 15.

Further, according to the above-described third embodiment of the power regeneration device for an operating machine in accordance with the present invention, the flow rate distribution is not changed while a lever operation signal is being inputted, that is, during the boom lowering operation. Thus, it is possible to prevent a sudden change in the operability and secure satisfactory operation of the operating machine desired by the operator.

Fourth Embodiment

Figure 9:
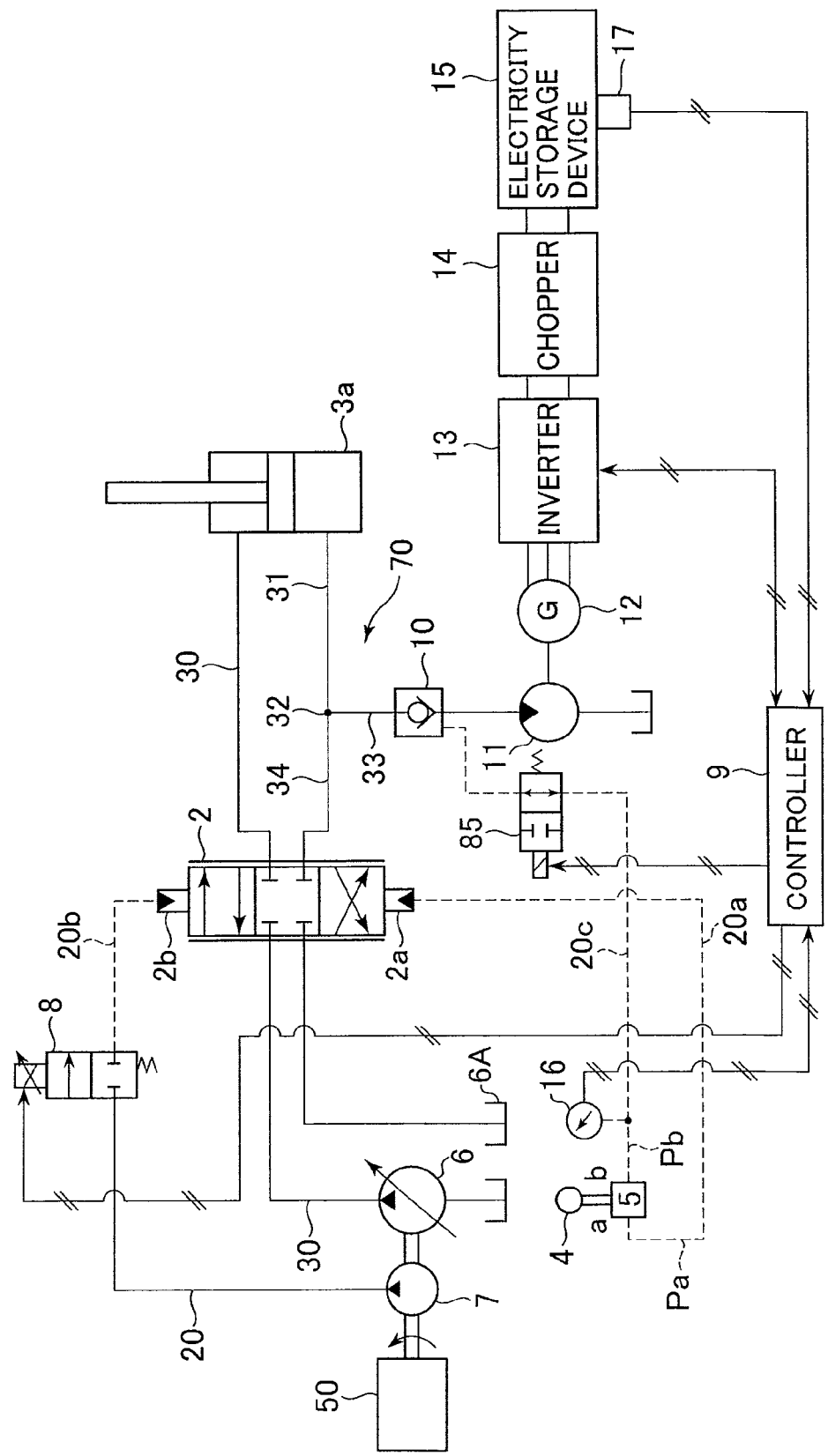
FIG. 9 is a schematic diagram of a control system illustrating a fourth embodiment of the power regeneration device for an operating machine in accordance with the present invention.
Figure 10:
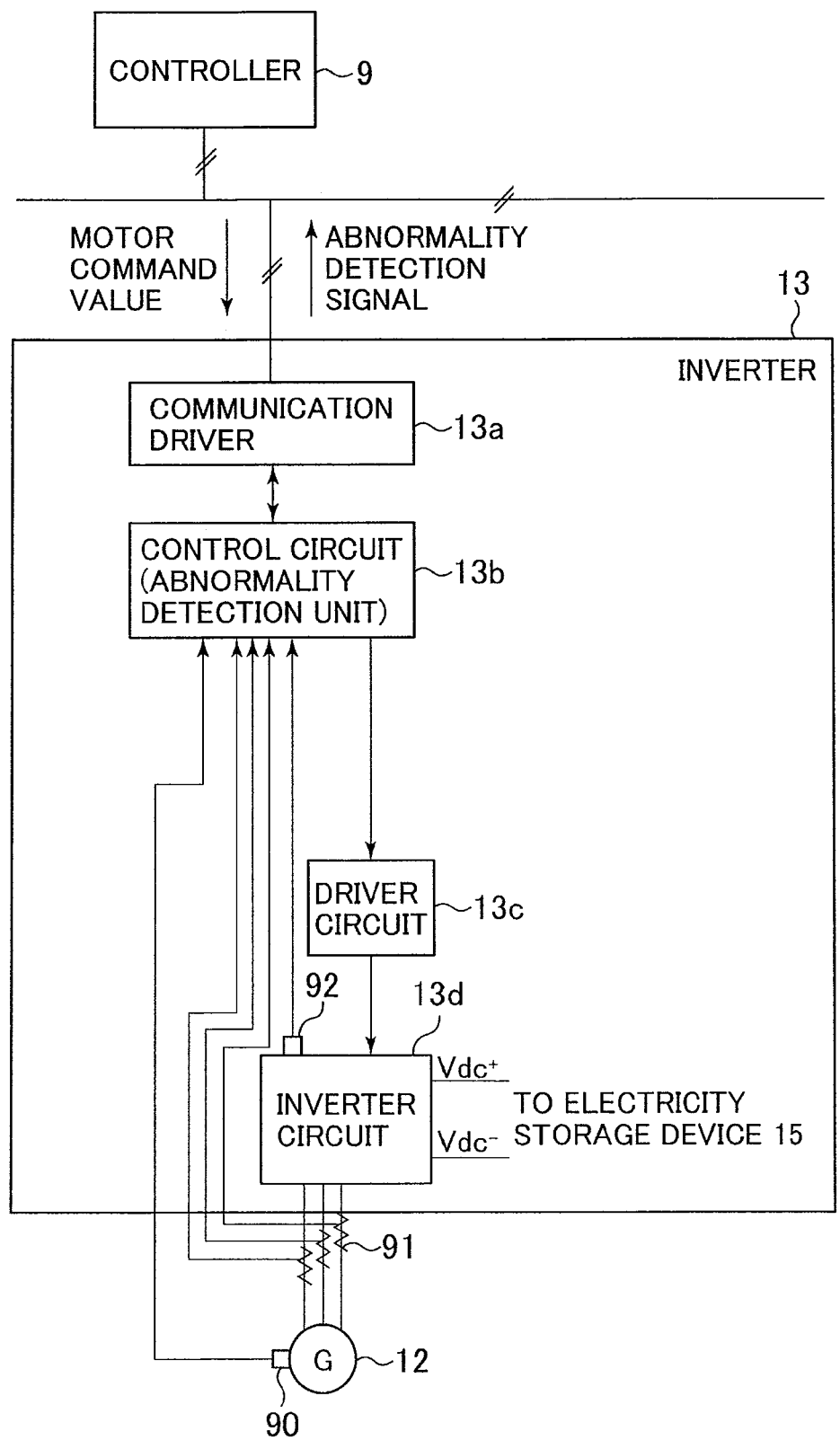
FIG. 10 is a schematic diagram showing an inverter and its peripheral hardware configuration constituting the fourth embodiment of the power regeneration device for an operating machine in accordance with the present invention.
Figure 11:
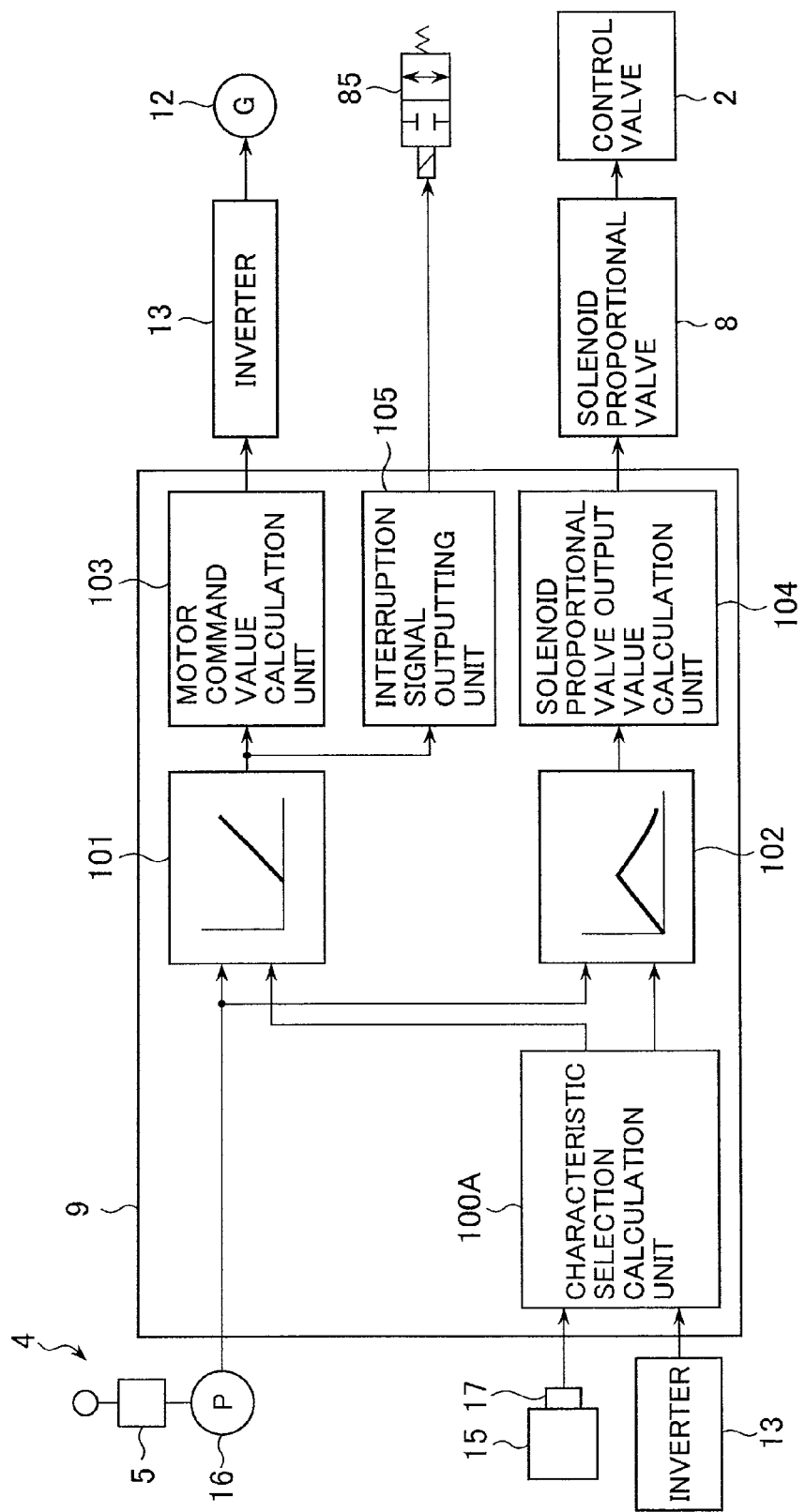
FIG. 11 is a block diagram of a controller constituting the fourth embodiment of the power regeneration device for an operating machine in accordance with the present invention.
Figure 12:
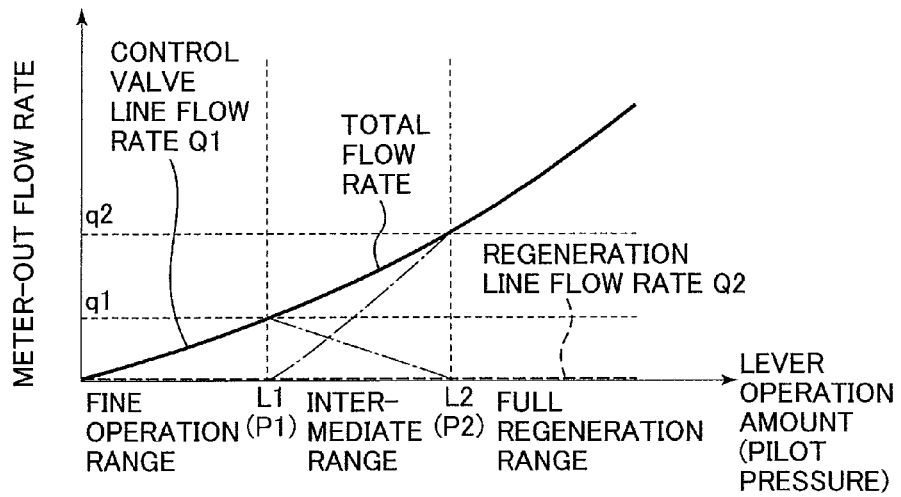
FIG. 12 is a metering characteristic diagram for explaining a characteristic selection circuit of the controller in the fourth embodiment of the power regeneration device for an operating machine in accordance with the present invention.
Figure 13:
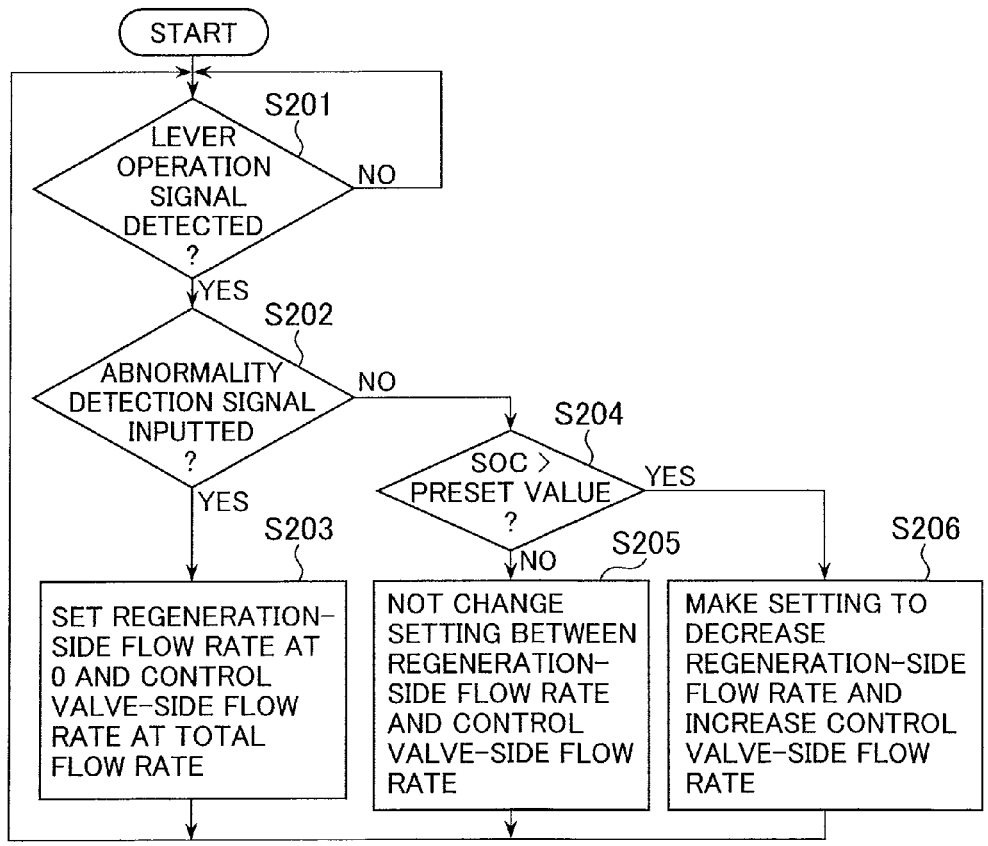
FIG. 13 is a flow chart showing a process executed by the controller in the fourth embodiment of the power regeneration device for an operating machine in accordance with the present invention.

Next, a fourth embodiment of the power regeneration device for an operating machine in accordance with the present invention will be described below referring to FIGS. 9 to 13. FIG. 9 is a schematic diagram of a control system illustrating the fourth embodiment of the power regeneration device for an operating machine in accordance with the present invention. FIG. 10 is a schematic diagram showing an inverter and its peripheral hardware configuration constituting the fourth embodiment of the power regeneration device for an operating machine in accordance with the present invention. FIG. 11 is a block diagram of a controller constituting the fourth embodiment of the power regeneration device for an operating machine in accordance with the present invention. FIG. 12 is a metering characteristic diagram for explaining a characteristic selection circuit of the controller in the fourth embodiment of the power regeneration device for an operating machine in accordance with the present invention. FIG. 13 is a flow chart showing a process executed by the controller in the fourth embodiment of the power regeneration device for an operating machine in accordance with the present invention. Reference characters in FIGS. 9 to 13 identical with those in FIGS. 1 to 8 represent components identical or corresponding to those in FIGS. 1 to 8, and thus repeated explanation thereof is omitted for brevity.

In the first embodiment described above, if the returning fluid flows into the regeneration line 33 when there is an abnormality in the generator 12 or the inverter 13 controlling the generator 12, excessive heating of the device can shorten the machine life or mechanical shocks can deteriorate the operability of the operating machine. This embodiment provides a power regeneration device for an operating machine capable of preventing the overcharge of the electricity storage device 15 without the need of increasing the capacity of the electricity storage device 15, similarly to the above-described first embodiment, while also securing fine operability even in case of an abnormality occurring in the generator 12 or the inverter 13 controlling the generator 12.

While the control system shown in FIG. 9, which is illustrating the fourth embodiment of the power regeneration device for an operating machine in accordance with the present invention, is configured substantially in the same way as the first embodiment, the following configurations are different from the first embodiment. First, the pilot secondary-side hydraulic line 20c is provided with a solenoid control valve 85 of the two-port two-position type for switching the connection/interruption of the hydraulic line, and control of the supply of the pilot hydraulic fluid from the pilot valve 5 of the operating device 4 to the pilot check valve 10 is enabled by a command from the controller 9. Specifically, when the command signal from the controller 9 is inputted to an operating part of the solenoid control valve 85, the port is switched to interrupt the pilot secondary-side hydraulic line 20c. At normal times when no command signal is inputted, a port for connecting the pilot secondary-side hydraulic line 20c is selected.

Second, the inverter 13 is provided with an abnormality detection unit enabling the detection of abnormalities of the inverter 13 and the generator 12 explained later. An abnormality signal outputted by the abnormality detection unit upon detection of an abnormality is inputted to the controller 9.

The inverter 13 in this embodiment will be explained below referring to FIG. 10. The inverter 13 includes a communication driver 13a, a control circuit 13b, a driver circuit 13c and an inverter circuit 13d. The communication driver 13a serves as a communication interface with other units such as the controller 9. The inverter circuit 13d includes switching elements such as IGBTs (Insulated Gate Bipolar Transistors). The driver circuit 13c drives and controls the inverter circuit 13d. The control circuit 13b performs the ON/OFF control of the switching elements of the inverter circuit 13d by outputting a control signal (torque command) to the driver circuit 13c.

Inputted to the control circuit 13b are the motor command values outputted from the controller 9, rotational position information (resolver signal) outputted from a position sensor 90 (e.g., magnetic pole position sensor) for detecting the rotational position of the generator 12, electric current information outputted from a current sensor 91 for detecting the electric current generated by the generator 12, and temperature information outputted from a temperature sensor 92 for detecting the temperature of the inverter circuit 13d. The control circuit 13b functions as a control unit for controlling the generator 12 based on the above pieces of inputted information, while also functioning as the abnormality detection unit for detecting the presence/absence of an abnormality occurring to the driver circuit 13c, the inverter circuit 13d, the generator 12, etc. The detection of the abnormalities of the driver circuit 13c, the inverter circuit 13d, the generator 12, etc. can be implemented by use of publicly known methods. The control circuit 13b detecting such an abnormality outputs the abnormality detection signal, representing the detection of the abnormality, to the controller 9.

The publicly known abnormality detection methods which can be employed by the control circuit 13b include the following methods: For example, the control circuit 13b may judge that an abnormality has occurred when deviations of the actual revolution speed of the generator 12 (which can be calculated from the output of the position sensor 90) and the actual torque value of the generator 12 (which can be calculated from the output of the current sensor 91) from a target revolution speed (target speed) and a target torque value of the generator 12 calculated from the motor command values have exceeded prescribed values. The control circuit 13b may also judge that an abnormality has occurred when the output of the temperature sensor 92 has reached a prescribed value. In cases where an abnormality occurring in the hydraulic motor 11 affects the behavior of the generator 12 or the inverter 13, the abnormality of the hydraulic motor 11 can also be detected with the above configuration.

Next, the controller 9 in this embodiment will be explained below referring to FIG. 11. While the controller 9 in this embodiment is configured substantially in the same way as that in the first embodiment shown in FIG. 5, the following two points are different: First, the abnormality signal from the inverter 13 is inputted to a characteristic selection calculation unit 100A. Second, the controller 9 is provided with an interruption signal outputting unit 105 for outputting a command signal to the solenoid control valve 85.

The characteristic selection calculation unit 100A detects the SOC based on the voltage value of the electricity storage device 15 detected by the voltage sensor 17 and selects and outputs a metering characteristic according to the result of comparison between the detected SOC and a preset value similarly to the characteristic selection calculation unit 100 in the first embodiment. However, when the abnormality signal from the inverter 13 is inputted, the characteristic selection calculation unit 100A selects and outputs the metering characteristic shown in FIG. 12.

FIG. 12 shows a metering characteristic of the control valve line flow rate Q1 and a metering characteristic of the regeneration line flow rate Q2 independent of the SOC value. The metering characteristic of the regeneration line flow rate Q2 has been set so that the meter-out flow rate of the regeneration line 33 equals 0 for any operation amount. Meanwhile, the metering characteristic of the control valve line flow rate Q1 has been set to coincide with the metering characteristic in FIG. 3 representing the total flow rate. Thus, upon the input of the abnormality signal from the inverter 13, the characteristic selection calculation unit 100A outputs the metering characteristics for having all the returning fluid from the bottom-side hydraulic chamber flow to the control valve line 34 and keeping the total flow rate of the returning fluid, flowing through the regeneration line 33 and the control valve line 34, unchanged before and after the input of the abnormality signal.

Returning to FIG. 11, the interruption signal outputting unit 105 is a unit which receives the regeneration line flow rate Q2 calculated by the second flow rate calculation unit 101 and outputs an interruption command signal to the solenoid control valve 85 when the regeneration line flow rate Q2 is 0 or less. The solenoid control valve 85 receiving the interruption command signal is operatively switched to a port for interrupting the pilot secondary-side hydraulic line 20c, by which the pilot check valve 10 shown in FIG. 9 is turned inactive. Consequently, the regeneration line 33 is interrupted and the flow rate of the returning fluid flowing through the regeneration line 33 becomes 0. On the other hand, the flow rate of the returning fluid flowing through the control valve line 34 is increased by the decrease in the flow rate of the returning fluid through the regeneration line 33.

Next, a process executed by the controller 9 in this embodiment for changing the regeneration line flow rate and the control valve line flow rate will be explained briefly referring to FIG. 13. The steps S204 to S206 executed by the controller 9 in this embodiment are identical with the steps S2 to S4 in the first embodiment shown in FIG. 4, and thus repeated explanation thereof is omitted for brevity. As the starting state in FIG. 13, the operator turns the key (unshown) of the hydraulic excavator to the ON position, for example.

In step S201, the controller judges the presence/absence of the boom lowering lever operation. Specifically, the judgment is made based on the presence/absence of the signal of the pilot pressure Pb inputted from the pressure sensor 16. When the controller judges that the boom lowering lever operation is under way (YES), the process advances to step S202, otherwise the step S201 is repeated until the judgment becomes YES.

In the step S202, the controller judges whether the abnormality signal is being inputted from the inverter 13. Specifically, the characteristic selection calculation unit 100A of the controller 9 makes the judgment based on the presence/absence of the abnormality detection signal from the inverter 13. When the abnormality detection signal is judged to be inputted (YES), the process advances to step S203, otherwise (NO) the process advances to the step S204.

In the step S203, the distribution between the regeneration line flow rate and the control valve line flow rate is determined so as to set the regeneration-side flow rate at 0 and the control valve-side flow rate at the total flow rate. Specifically, the characteristic selection calculation unit 100A shown in FIG. 11 outputs the aforementioned metering characteristics for the cases of detecting an abnormality of the inverter 13 to the second flow rate calculation unit 101 and the first flow rate calculation unit 102 and the interruption signal outputting unit 105 outputs the interruption command signal to the solenoid control valve 85.

The flow from the step S204 to the step S206 is identical with that from the step S2 to the step S4 in the first embodiment shown in FIG. 4.

After the step S203, similarly to the flow after the step S205 or S206, the process returns to the step S201 to repeat the above procedure.

The aforementioned step S203 will be explained in detail referring to FIG. 11.

Upon the input of the abnormality signal from the inverter 13, the characteristic selection calculation unit 100A outputs the metering characteristic for setting the meter-out flow rate of the regeneration line 33 at 0 for any operation amount to the second flow rate calculation unit 101, while outputting the metering characteristic coinciding with the total flow rate of the control valve line flow rate Q1 and the regeneration line flow rate Q2 to the first flow rate calculation unit 102.

Based on the received metering characteristic, the second flow rate calculation unit 101 sets the regeneration line flow rate Q2 at 0 irrespective of the operation amount of the operating device 4 and outputs the regeneration line flow rate Q2 to the motor command value calculation unit 103 and the interruption signal outputting unit 105. Meanwhile, the first flow rate calculation unit 102 outputs the control valve line flow rate Q1, calculated based on the operation amount of the operating device 4 and the metering characteristic coinciding with the total flow rate, to the solenoid proportional valve output value calculation unit 104.

At the same time, the interruption signal is outputted from the interruption signal outputting unit 105 to the solenoid control valve 85, by which the solenoid control valve 85 is driven to the interrupting position and interrupts the pilot secondary-side hydraulic line 20c. Therefore, the pilot check valve 10 is kept closed irrespective of the operation amount of the operating device 4 and no returning fluid from the bottom-side hydraulic chamber flows in the regeneration line 33 (the hydraulic motor 11).

Meanwhile, all the returning fluid from the bottom-side hydraulic chamber flows into the control valve line 34 since an opening degree command for the total flow rate is outputted to the solenoid proportional valve 8. Consequently, the sum total of the regeneration line flow rate Q2 and the control valve line flow rate Q1 remains unchanged before and after the detection of the abnormality of the inverter 13.

As described above, the inflow of the returning fluid from the bottom-side hydraulic chamber into the regeneration line 33 can be prevented when the abnormality detection signal of the inverter 13 is being outputted.

According to the above-described fourth embodiment of the power regeneration device for an operating machine in accordance with the present invention, the overcharge of the electricity storage device 15 can be prevented without the need of increasing the capacity of the electricity storage device 15.

Further, according to the above-described fourth embodiment of the power regeneration device for an operating machine in accordance with the present invention, the inflow of the returning fluid from the bottom-side hydraulic chamber into the regeneration line 33 is prevented when an abnormality has occurred to the generator 12 or the inverter 13 controlling the generator 12. Thus, the shortening of the machine life due to excessive heating of the device and the deterioration of the operability of the operating machine due to mechanical shocks can be prevented. This makes it possible to provide a power regeneration device for an operating machine capable of securing fine operability even in case of an abnormality occurring in the generator 12 or the inverter 13 controlling the generator 12.

Fifth Embodiment

Figure 14:
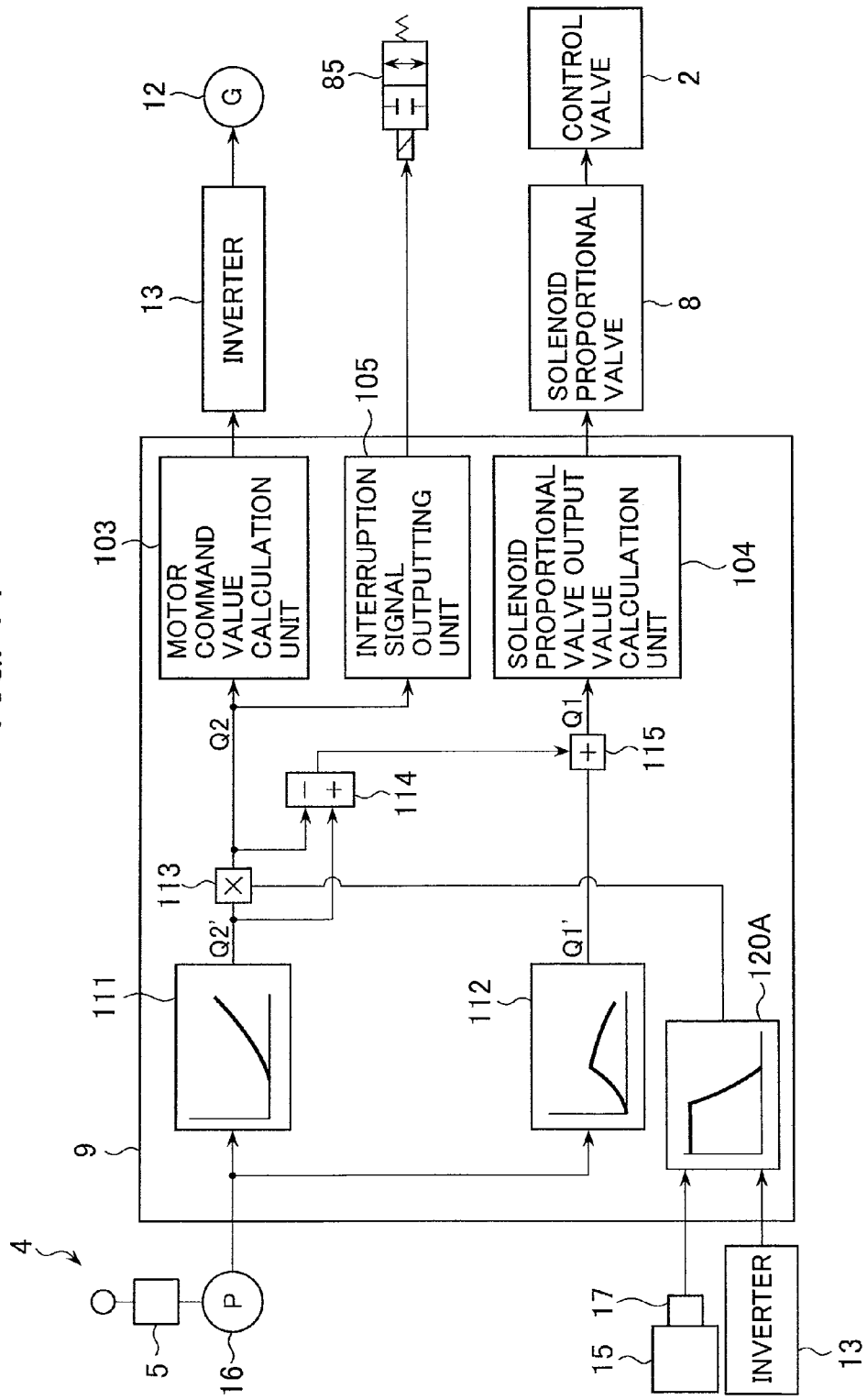
FIG. 14 is a block diagram of a controller constituting a fifth embodiment of the power regeneration device for an operating machine in accordance with the present invention.

Next, a fifth embodiment of the power regeneration device for an operating machine in accordance with the present invention will be described below referring to FIG. 14. FIG. 14 is a block diagram of a controller constituting the fifth embodiment of the power regeneration device for an operating machine in accordance with the present invention. Reference characters in FIG. 14 identical with those in FIGS. 1 to 13 represent components identical or corresponding to those in FIGS. 1 to 13, and thus repeated explanation thereof is omitted for brevity.

This embodiment is substantially identical with the fourth embodiment except for the configuration of the controller 9. While the controller 9 in this embodiment is configured substantially in the same way as that in the second embodiment shown in FIG. 7, the following two points are different: First, the abnormality signal from the inverter 13 is inputted to a correction signal calculation unit 120A. Second, the controller 9 is provided with an interruption signal outputting unit 105 for outputting a command signal to the solenoid control valve 85.

The correction signal calculation unit 120A detects the SOC based on the voltage value of the electricity storage device 15 detected by the voltage sensor 17, calculates a preset correction signal according to the detected SOC, and outputs the correction signal to the multiplier 113 similarly to the correction signal calculation unit 120 in the second embodiment. However, when the abnormality signal from the inverter 13 is inputted, the correction signal calculation unit 120A outputs a value 0 to the multiplier 113 as the correction signal.

The interruption signal outputting unit 105 is a unit which receives the regeneration line flow rate Q2 calculated by the multiplier 113 and outputs an interruption command signal to the solenoid control valve 85 when the regeneration line flow rate Q2 is 0 or less. The other features are equivalent to those in the fourth embodiment.

Next, the operation in this embodiment when the abnormality signal from the inverter 13 is inputted to the controller 9 will be explained below referring to FIG. 14.

Upon the input of the abnormality signal from the inverter 13, the correction signal calculation unit 120A outputs the value 0 to the multiplier 113 as the correction signal. According to the correction signal, the flow rte Q2' of the returning fluid flowing through the regeneration line 33, calculated by the second flow rate calculation unit 111 based on the operation amount, is corrected. Then a zero signal as the regeneration line flow rate Q2 is outputted to the motor command value calculation unit 103, the interruption signal outputting unit 105 and the subtractor 114.

The subtractor 114, which is used for calculating the difference between the flow rates Q2' (outputs of the second flow rate calculation unit 111) before and after the correction by the multiplier 113, outputs the calculated flow rate difference to the adder 115. The adder 115 adds the flow rate Q1' of the returning fluid through the control valve line 34, which is calculated by the first flow rate calculation unit 112 based on the operation amount, and the flow rate difference calculated by the subtractor 114. Then the adder 115 outputs the sum to the solenoid proportional valve output value calculation unit 104 as the control valve line flow rate Q1. Therefore, the sum total of the outputs of the second flow rate calculation unit 111 and the first flow rate calculation unit 112 does not change.

Thus, all the returning fluid from the bottom-side hydraulic chamber flows into the control valve line 34 since an opening degree command for the total flow rate is outputted to the solenoid proportional valve 8. Consequently, the sum total of the regeneration line flow rate Q2 and the control valve line flow rate Q1 remains unchanged before and after the detection of the abnormality of the inverter 13. Further, when the abnormality detection signal is outputted by the inverter 13, the interruption signal is outputted from the interruption signal outputting unit 105 to the solenoid control valve 85 to drive the solenoid control valve 85 to the interrupting position, by which the pilot secondary-side hydraulic line 20c is interrupted. Consequently, the inflow of the returning fluid from the bottom-side hydraulic chamber into the regeneration line 33 can be prevented.

According to the above-described fifth embodiment of the power regeneration device for an operating machine in accordance with the present invention, effects similar to those of the fourth embodiment can be achieved.

DESCRIPTION OF REFERENCE CHARACTERS 1 hydraulic excavator
1a boom
2 control valve
2a pilot pressure receiving part
2b pilot pressure receiving part
3a boom cylinder
4 operating device
6 hydraulic pump
6A tank
7 pilot fluid pump
8 solenoid proportional valve
9 controller (flow rate calculation means)
10 pilot check valve
11 hydraulic motor
12 generator
13 inverter 15 electricity storage device
16 pressure sensor (operation amount detection means)
17 voltage sensor (electric amount detection means)
31 hydraulic line
32 branching part
33 regeneration line
34 control valve line
50 engine
100 characteristic selection calculation unit
101 second flow rate calculation unit
102 first flow rate calculation unit
103 motor command value calculation unit
104 solenoid proportional valve output value calculation unit
105 interruption signal outputting unit
111 second flow rate calculation unit
112 first flow rate calculation unit
120 correction signal calculation unit

The invention claimed is:

1. A power regeneration device for an operating machine equipped with an engine (50), a hydraulic pump (6) driven by the engine (50), a control valve (2) for switching the flow of hydraulic fluid from the hydraulic pump (6) and supplying the hydraulic fluid to a hydraulic cylinder (3a), and an operating device (4) for controlling the control valve (2), comprising:
   a hydraulic line (31) which is connected to a bottom-side hydraulic chamber of the hydraulic cylinder (3a) and through which returning fluid returning to a tank (6A) flows when the hydraulic cylinder (3a) contracts;
   a branching part (32) which is provided in the hydraulic line (31) to separate the hydraulic line (31) into a plurality of hydraulic lines;
   a regeneration line (33) which is connected to the branching part (32) and leads the returning fluid to the tank (6A) via a hydraulic motor (11) that is connected with a generator (12) controlled by an inverter (13);
   a control valve line (34) which is connected to the branching part (32) and leads the returning fluid to the tank (6A) via the control valve (2);
   operation amount detection means (16) which detects the operation amount of the operating device (4);
   an electricity storage device (15) which stores electric power generated by the generator (12);
   electric amount detection means (17) which detects the electric amount of the electricity storage device (15);
   flow rate calculation means (9) which calculates the flow rate of the returning fluid flowing through the regeneration line (33) and the flow rate of the returning fluid flowing through the control valve line (34) depending on an electric amount signal from the electric amount detection means (17);
   first flow rate control means (8) which controls the flow rate through the control valve line (34) based on the result of the calculation by the flow rate calculation means (9); and
   second flow rate control means (13) which controls the flow rate through the regeneration line (33) based on the result of the calculation by the flow rate calculation means (9).

2. The power regeneration device for an operating machine according to claim 1, wherein the flow rate calculation means (9) includes:
   characteristic selection means (100) which stores a plurality of characteristics of a meter-out flow rate of the hydraulic cylinder (3a) with respect to the operation amount of the operating device (4) when the hydraulic cylinder (3a) is contracted, receives the electric amount signal from the electric amount detection means (17), and outputs one of the stored characteristics of the meter-out flow rate depending on the electric amount signal;
   first flow rate calculation means (102) which calculates the flow rate of the returning fluid flowing through the control valve line (34) based on the operation amount detected by the operation amount detection means (16) and the relationship between the operation amount and the meter-out flow rate outputted by the characteristic selection means (100) and outputs a command signal to the first flow rate control means (8); and
   second flow rate calculation means (101) which calculates the flow rate of the returning fluid flowing through the regeneration line (33) based on the operation amount detected by the operation amount detection means (16) and the relationship between the operation amount and the meter-out flow rate outputted by the characteristic selection means (100) and outputs a command signal to the second flow rate control means (13).

3. The power regeneration device for an operating machine according to claim 2, further comprising abnormality detection means for detecting abnormalities occurring to the generator (12) and the inverter (13), wherein when an abnormality of the generator (12) or the inverter (13) is detected by the abnormality detection means, the characteristic selection means (100) outputs a characteristic of the meter-out flow rate for setting the flow rate of the returning fluid flowing through the regeneration line (33) at 0 to the second flow rate calculation means (101) while outputting a characteristic of the meter-out flow rate for increasing the flow rate of the returning fluid flowing through the control valve line (34) by the decrease in the flow rate of the returning fluid through the regeneration line (33) to the first flow rate calculation means (102).

4. The power regeneration device for an operating machine according to claim 1, wherein the flow rate calculation means (9) fixes a distribution characteristic between the flow rate of the returning fluid flowing through the regeneration line (33) and the flow rate of the returning fluid flowing through the control valve line (34) while a lowering operation signal of the operating device (4) is detected.

5. The power regeneration device for an operating machine according to claim 1, wherein the flow rate calculation means (9) includes:
   first flow rate calculation means (112) which stores a characteristic of a meter-out flow rate of the hydraulic cylinder (3a) with respect to the operation amount of the operating device (4) when the hydraulic cylinder (3a) is contracted, receives an operation amount signal from the operation amount detection means (16), and calculates the flow rate of the returning fluid flowing through the control valve line (34) based on the operation amount signal and the stored characteristic of the meter-out flow rate;
   second flow rate calculation means (111) which stores a characteristic of the meter-out flow rate of the hydraulic cylinder (3a) with respect to the operation amount of the operating device (4) when the hydraulic cylinder (3a) is contracted, receives the operation amount signal from the operation amount detection means (16), and calculates the flow rate of the returning fluid flowing through the regeneration line (33) based on the operation amount signal and the stored characteristic of the meter-out flow rate; and
   correction signal calculation means (120) which receives the electric amount signal from the electric amount detection means (17) and calculates a correction characteristic depending on the electric amount signal, wherein an output signal from the first flow rate calculation means (112) and an output signal from the second flow rate calculation means (111) are corrected according to a correction signal from the correction signal calculation means (120).

6. The power regeneration device for an operating machine according to claim 5, further comprising abnormality detection means for detecting abnormalities occurring to the generator (12) and the inverter (13), wherein when an abnormality of the generator (12) or the inverter (13) is detected by the abnormality detection means, the correction signal calculation means (120) corrects the flow rate of the returning fluid flowing through the regeneration line (33), which is controlled by the second flow rate control means (13) according to the operation amount, to 0, while correcting the flow rate of the returning fluid flowing through the control valve line (34), which is controlled by the first flow rate control means (8) according to the operation amount, so as to increase the flow rate by the decrease in the flow rate at the second flow rate control means (13).

7. The power regeneration device for an operating machine according to claim 1, wherein a solenoid proportional valve (8) for controlling pilot pressure on the control valve (2) is provided in order to control the flow rate of the returning fluid flowing through the control valve line (34).

\* \* \* \* \*